US012299932B2

(12) United States Patent
Ossig et al.

(10) Patent No.: US 12,299,932 B2
(45) Date of Patent: May 13, 2025

(54) COMPENSATION OF THREE-DIMENSIONAL MEASURING INSTRUMENT HAVING AN AUTOFOCUS CAMERA

(71) Applicant: FARO Technologies, Inc., Lake Mary, FL (US)

(72) Inventors: Martin Ossig, Tamm (DE); Johannes Buback, Korntal-Munchingen (DE)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 18/369,658

(22) Filed: Sep. 18, 2023

(65) Prior Publication Data
US 2024/0087167 A1    Mar. 14, 2024

Related U.S. Application Data

(63) Continuation of application No. 17/813,630, filed on Jul. 20, 2022, now Pat. No. 11,763,491, which is a
(Continued)

(51) Int. Cl.
*G06T 7/80* (2017.01)
*G06T 7/521* (2017.01)
(Continued)

(52) U.S. Cl.
CPC ............ *G06T 7/80* (2017.01); *G06T 7/521* (2017.01); *G06T 7/571* (2017.01); *H04N 23/56* (2023.01);
(Continued)

(58) Field of Classification Search
CPC ........... G06T 7/80; G06T 7/521; G06T 7/571; G06T 2207/10148; G06T 2207/30204;
(Continued)

(56) References Cited

U.S. PATENT DOCUMENTS 8,401,276 B1    3/2013   Cho et al.
9,224,022 B2   12/2015   Ackley et al.
(Continued)

FOREIGN PATENT DOCUMENTS

| JP | 2019-066451 | * | 12/2017 | ............... G06T 7/62 |
| KR | 20190041289 A | * | 4/2019 | ............. H04N 23/63 |
| WO | 2018/020244 A1 | | 2/2018 | |

OTHER PUBLICATIONS

U.S. Appl. No. 17/076,070, filed Oct. 21, 2020, now U.S. Pat. No. 11,481,917, Issued.
(Continued)

*Primary Examiner* — Marnie A Matt
(74) *Attorney, Agent, or Firm* — McCarter & English, LLP

(57) ABSTRACT

A 3D measuring instrument and method of operation is provided that includes a registration camera and a an autofocus camera. The method includes capturing with the registration camera a first registration image of a first plurality of points and a first image with the first camera with the instrument in a first pose. A plurality of three-dimensional (3D) coordinates of points are determined based on the first image. A second registration image of a second plurality of points is captured in a second pose and a focal length of the autofocus camera is adjusted. A second surface image is captured with the first camera having the adjusted focal length. A compensation parameter is determined based in part on the captured second surface image. The determined compensation parameter is stored.

18 Claims, 25 Drawing Sheets

Related U.S. Application Data continuation-in-part of application No. 17/076,070, filed on Oct. 21, 2020, now Pat. No. 11,481,917.

(51) Int. Cl.
   *G06T 7/571* (2017.01)
   *H04N 23/56* (2023.01)
   *H04N 23/67* (2023.01)

(52) U.S. Cl.
   CPC ... *H04N 23/67* (2023.01); *G06T 2207/10148* (2013.01); *G06T 2207/30204* (2013.01)

(58) Field of Classification Search
   CPC .......... G06T 2207/10021; H04N 23/56; H04N 23/67; H04N 23/671; G01B 11/2545; G01B 21/045; G01B 11/2518
   USPC ........................................................ 348/136
   See application file for complete search history.

(56) References Cited

U.S. PATENT DOCUMENTS

| | | |
|---|---|---|
| 9,599,455 B2 | 3/2017 | Heidemann et al. |
| 9,948,918 B2 | 4/2018 | Cheng |
| 10,121,039 B2 | 11/2018 | Todeschini et al. |
| 10,755,428 B2 | 8/2020 | Aswin |
| 11,481,917 B2 | 10/2022 | Ossig et al. |
| 11,763,491 B2 | 9/2023 | Ossig et al. |
| 2010/0074532 A1 | 3/2010 | Gordon et al. |
| 2014/0028805 A1 | 1/2014 | Tohme |
| 2015/0015701 A1 | 1/2015 | Yu |
| 2015/0042840 A1* | 2/2015 | Komatsu ................ G06T 7/33 348/222.1 |
| 2015/0138349 A1 | 5/2015 | Hebert et al. |
| 2015/0286033 A1 | 10/2015 | Osborne |
| 2017/0094259 A1* | 3/2017 | Kouperman ......... H04N 13/111 |
| 2018/0089848 A1* | 3/2018 | Yang ...................... G06T 7/521 |
| 2018/0132726 A1 | 5/2018 | Dickie et al. |
| 2019/0096079 A1* | 3/2019 | Ishibashi .............. H04N 13/239 |
| 2019/0154430 A1 | 5/2019 | Weston et al. |
| 2020/0014909 A1 | 1/2020 | Doring et al. |
| 2020/0296249 A1 | 9/2020 | Parian et al. |
| 2021/0137653 A1 | 5/2021 | Saphier et al. |
| 2022/0124253 A1 | 4/2022 | Ossig et al. |

OTHER PUBLICATIONS

U.S. Appl. No. 17/813,630, filed Jul. 20, 2022, now U.S. Pat. No. 11,763,491, Issued.

European Office Action for Application No. 21203116.5, dated Feb. 22, 2022, 10 pages.

\* cited by examiner

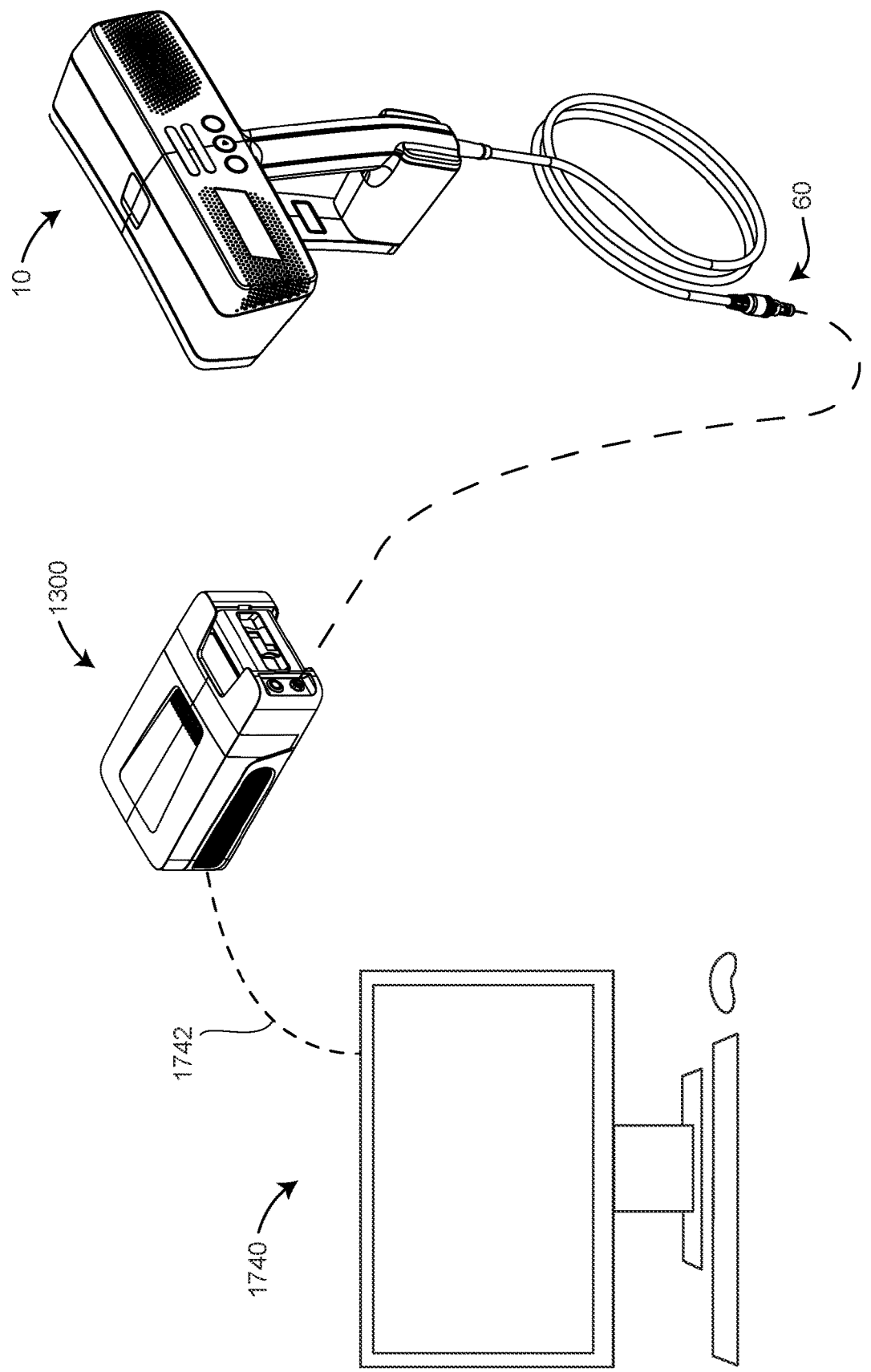

COMPENSATION OF THREE-DIMENSIONAL MEASURING INSTRUMENT HAVING AN AUTOFOCUS CAMERA

CROSS-REFERENCE TO RELATED APPLICATION

The present application is a continuation of and claims the benefit of U.S. Non-Provisional patent application Ser. No. 17/813,630, filed on Jul. 20, 2022, which is a continuation application and claims the benefit of U.S. Non-Provisional patent application Ser. No. 17/076,070, filed Oct. 21, 2020, now U.S. Pat. No. 11,481,917, the contents of both of which are incorporated by reference herein.

FIELD OF THE INVENTION

The subject invention relates to mobile three-dimensional (3D) measuring instruments that include an autofocus camera.

BACKGROUND

Scanners are 3D measuring instruments that determine 3D coordinates of objects by projecting light onto the objects and recording images of the projected light with cameras. Scanners may encounter difficulties measuring small features up close or large objects far away. An autofocus camera can provide ability to measure such nearby or distant objects, but problems arise in trying to maintain compensation when using an autofocus camera in this way.

Accordingly, while existing scanners and other 3D instruments are suitable for their intended purpose, a way is needed to obtain compensation parameters during scanner operation, particularly in response to changing environmental conditions or changing measurement distances.

SUMMARY OF THE INVENTION

In an exemplary embodiment of the invention, a method includes providing an instrument having a registration camera and a surface measuring system, the surface measuring system having a first camera and a projector, the first camera including an autofocus camera having a photosensitive array and an autofocus mechanism. When the instrument is in a first pose at a first time, a first registration image of a first plurality of registration points is captured with the registration camera. When the instrument is in the first pose, a first light is projected onto an object with the projector and a first surface image of the first light on the object is captured with the first camera. A first plurality of three-dimensional (3D) coordinates of surface points on the object are determined based at least in part on the projected first light and the captured first surface image. When the instrument in a second pose at a second time, a second registration image of a second plurality of registration points is captured with the registration camera. When the instrument is in the second pose, the autofocus mechanism is adjusted based at least in part on adjusting a focal length to reduce a difference between positions of the first plurality of registration points and the second plurality of registration points. A second light is projected onto the object with the projector, and a second surface image of the second light on the object is captured with the first camera. A compensation parameter is determined based at least in part on the first registration image, the second registration image, the first plurality of 3D coordinates, the projected second light, and the captured second surface image. The determined compensation parameter is stored.

In addition to one or more of the features described herein, or as an alternative, further embodiments of the method may include for the instrument in the second pose, determining a second plurality of 3D coordinates of surface points on the object based at least in part on the determined compensation parameter, the first registration image, the second registration image, the first plurality of 3D coordinates, the projected second light, and the captured second surface image.

In addition to one or more of the features described herein, or as an alternative, further embodiments of the method may include: further providing the surface measuring system with a second camera; for the instrument in the first pose, determining the first plurality of 3D coordinates further based in part on a third surface image captured by the second camera, the third surface image being an image of the projected first light on the object; and for the instrument in the second pose, further determining the second plurality of 3D coordinates based in part on a fourth surface image captured by the second camera, the fourth surface image being an image of the second light on the object.

In addition to one or more of the features described herein, or as an alternative, further embodiments of the method may include the compensation parameter including at least one of an intrinsic parameter of the first camera and an extrinsic parameter of the instrument.

In addition to one or more of the features described herein, or as an alternative, further embodiments of the method may include the compensation parameter includes at least the focal length of the first camera.

In addition to one or more of the features described herein, or as an alternative, further embodiments of the method may include: in capturing with the registration camera the first registration image of the first plurality of registration points, the first plurality of registration points includes at least one of natural feature points and artificial marker points; and in capturing with the registration camera the second registration image of the second plurality of registration points, the second plurality of registration points includes at least one of natural feature points and artificial marker points.

In addition to one or more of the features described herein, or as an alternative, further embodiments of the method may include the registration camera having a second autofocus mechanism.

In a further embodiment of the invention, a method includes: providing an instrument having a registration camera and a surface measuring system, the surface measuring system having a first camera and a projector, the first camera including an autofocus camera having an autofocus mechanism; for the instrument in a first pose, capturing with the registration camera a first registration image of a first plurality of registration points; for the instrument in the first pose, projecting first light onto an object with the projector, capturing with the first camera a first surface image of the first light on the object, and determining a first plurality of three-dimensional (3D) coordinates of surface points on the object based at least in part on the projected first light and the captured first surface image; for the instrument in a second pose at a second time, capturing with the registration camera a second registration image of a second plurality of registration points; for the instrument in the second pose, adjusting the autofocus mechanism, based at least in part on adjusting a focal length to reduce a difference between positions of the first plurality of registration points and the second plurality of registration points; for the instrument in the second pose, projecting second light onto the object with the projector, capturing with the first camera a second surface image of the second light on the object, and determining a compensation parameter based at least in part on the first registration image, the second registration image, the first plurality of 3D coordinates, the projected second light, and the captured second surface image; storing the determined compensation parameter; for the instrument in the second pose, determining a second plurality of 3D coordinates of surface points on the object based at least in part on the determined compensation parameter, the first registration image, the second registration image, the first plurality of 3D coordinates, the projected second light, and the captured second surface image; and adjusting an angle of a first optical axis of the first camera with a first actuator.

In addition to one or more of the features described herein, or as an alternative, further embodiments of the method may include: further providing the surface measuring system with a second camera; for the instrument in the first pose, determining the first plurality of 3D coordinates further based in part on a third surface image captured by the second camera, the third surface image being an image of the projected first light on the object; and for the instrument in the second pose, further determining the second plurality of 3D coordinates based in part on a fourth surface image captured by the second camera, the fourth surface image being an image of the second light on the object.

In addition to one or more of the features described herein, or as an alternative, further embodiments of the method may include adjusting an angle of a second optical axis of the second camera with a second actuator.

In a further embodiment of the invention, a method includes: providing an instrument having a registration camera and a surface measuring system, the registration camera including an autofocus camera having an autofocus mechanism, the surface measuring system having a first camera and a projector; for the instrument in a first pose, projecting first light onto an object with the projector, capturing with the first camera a first surface image of the first light on the object, and determining a first plurality of three-dimensional (3D) coordinates of surface points on the object based at least in part on the projected first light and the captured first surface image; for the instrument in the first pose, capturing with the registration camera a first registration image of a first plurality of registration points; for the instrument in a second pose, projecting second light onto the object with the projector, and capturing with the first camera a second surface image of the second light on the object; for the instrument in the second pose, adjusting the autofocus mechanism, capturing with the registration camera a second registration image of a second plurality of registration points, and determining a compensation parameter based at least in part on the first registration image, the second registration image, the first plurality of 3D coordinates, the projected second light, and the captured second image; and storing the determined compensation parameter.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 11C illustrates a method of interconnecting a mobile PC with a workstation according to an embodiment of the present invention;

DESCRIPTION OF THE EMBODIMENTS

Figure 1:
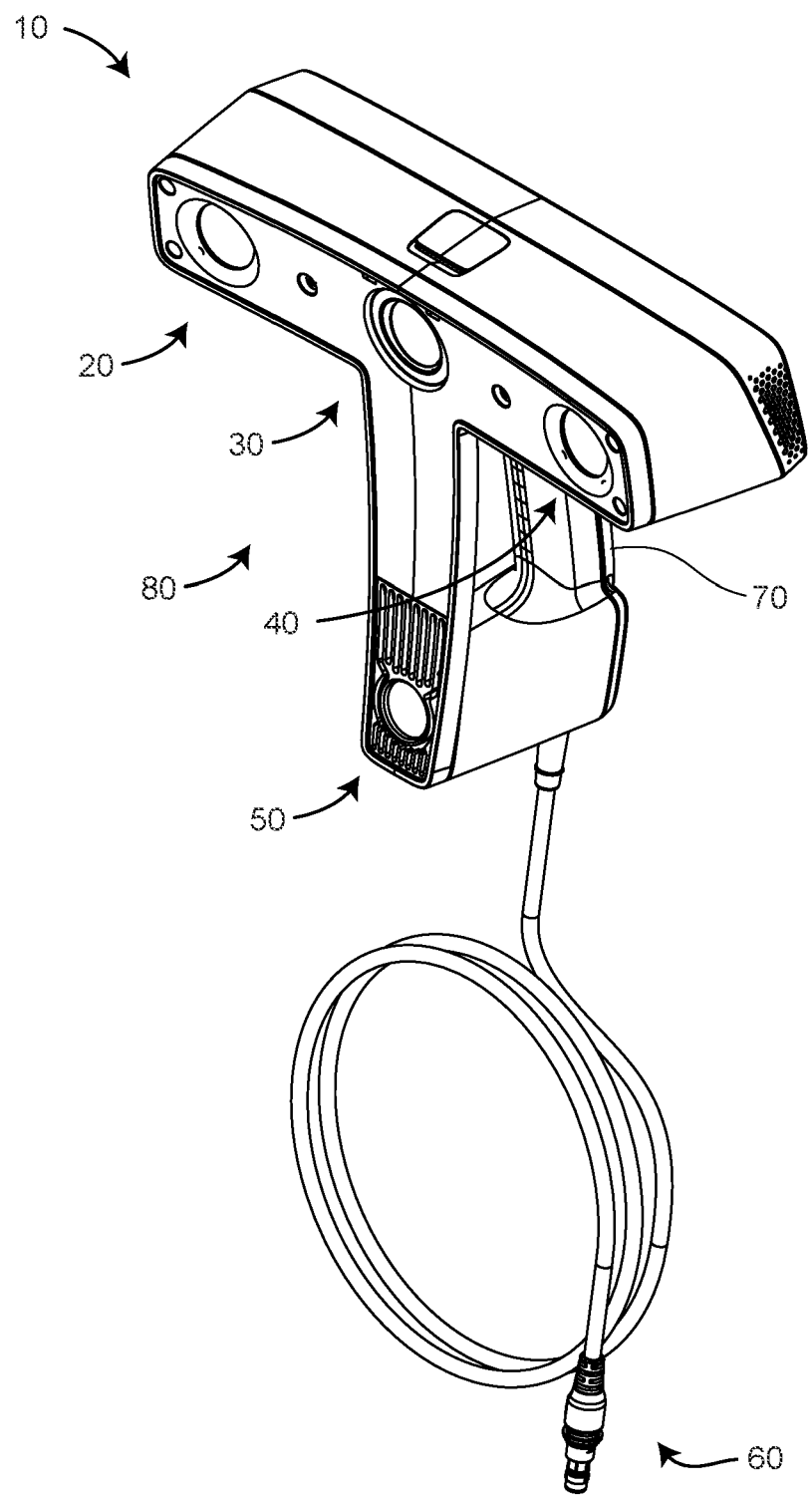
FIG. 1 is a front perspective view of a 3D triangulation scanner according to an embodiment of the present invention.

The following description is merely exemplary in nature and is not intended to limit the present disclosure, its application or uses. It should be understood that throughout the drawings, corresponding reference numerals indicate like or corresponding parts and features.

Figure 2:
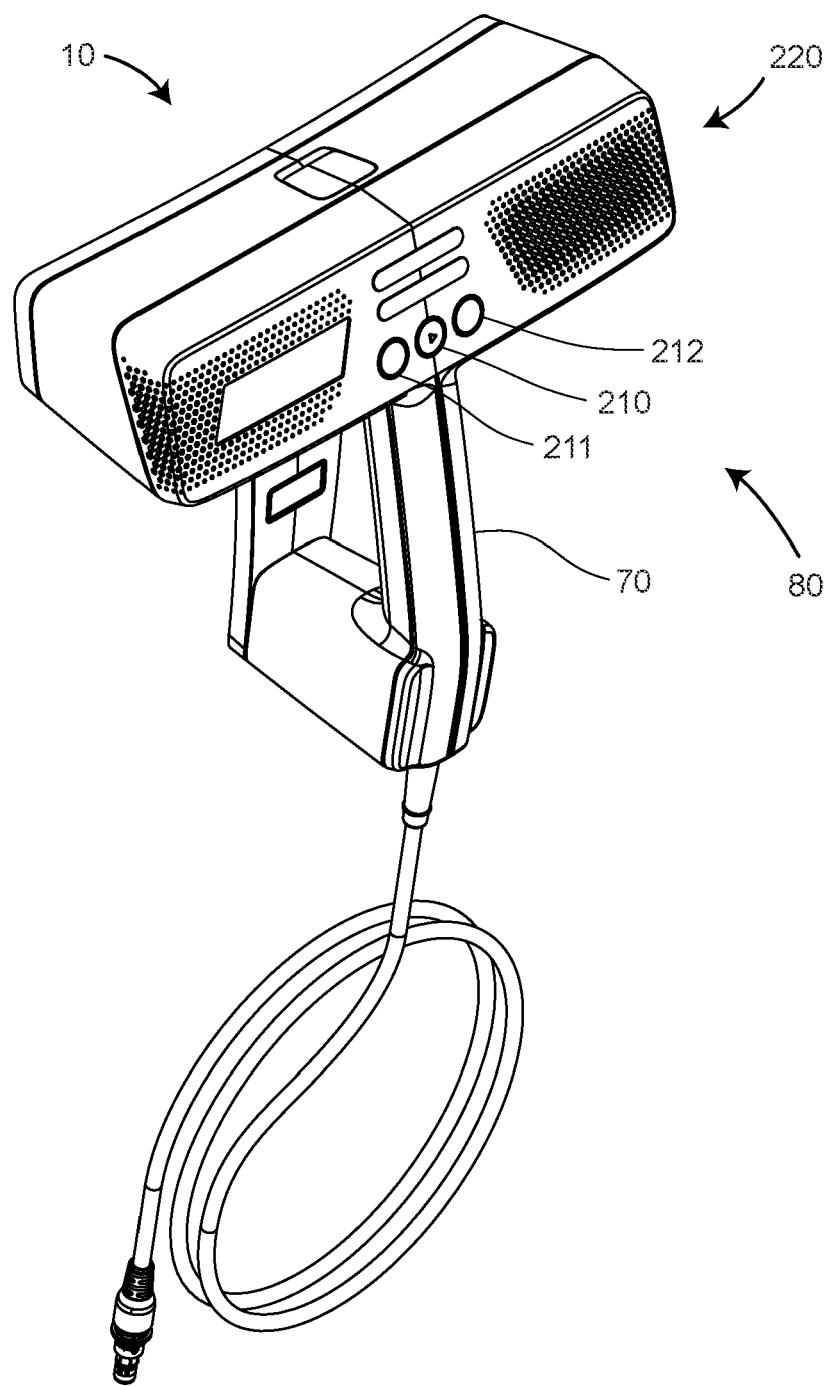
FIG. 2 is a rear perspective view of the 3D triangulation scanner according to an embodiment of the present invention.

FIG. 1 is a front perspective view of a handheld 3D triangulation scanner 10, also referred to as a handheld 3D imager or 3D camera. The 3D triangulation scanner 10 is capable of obtaining a three-dimensional image of the environment or of an object in the environment. In an embodiment, the scanner 10 includes a first infrared (IR) camera 20, a second IR camera 40, a registration camera 30, a projector 50, an Ethernet cable 60 and a handle 70. In an embodiment, the registration camera 30 is a color camera. Ethernet is a family of computer networking technologies standardized under IEEE 802.3. The enclosure 80 includes the outmost enclosing elements of the scanner 10. FIG. 2 is a rear perspective view of the scanner 10 further showing an exemplary perforated rear cover 220 and a scan start/stop button 210. In an embodiment, buttons 211, 212 may be programmed to perform functions according to the instructions of a computer program, the computer program either stored internally within the scanner 10 or externally in an external computer. In an embodiment, each of the buttons 210, 211, 212 includes at its periphery a ring illuminated by a light emitting diode (LED).

Figure 3:
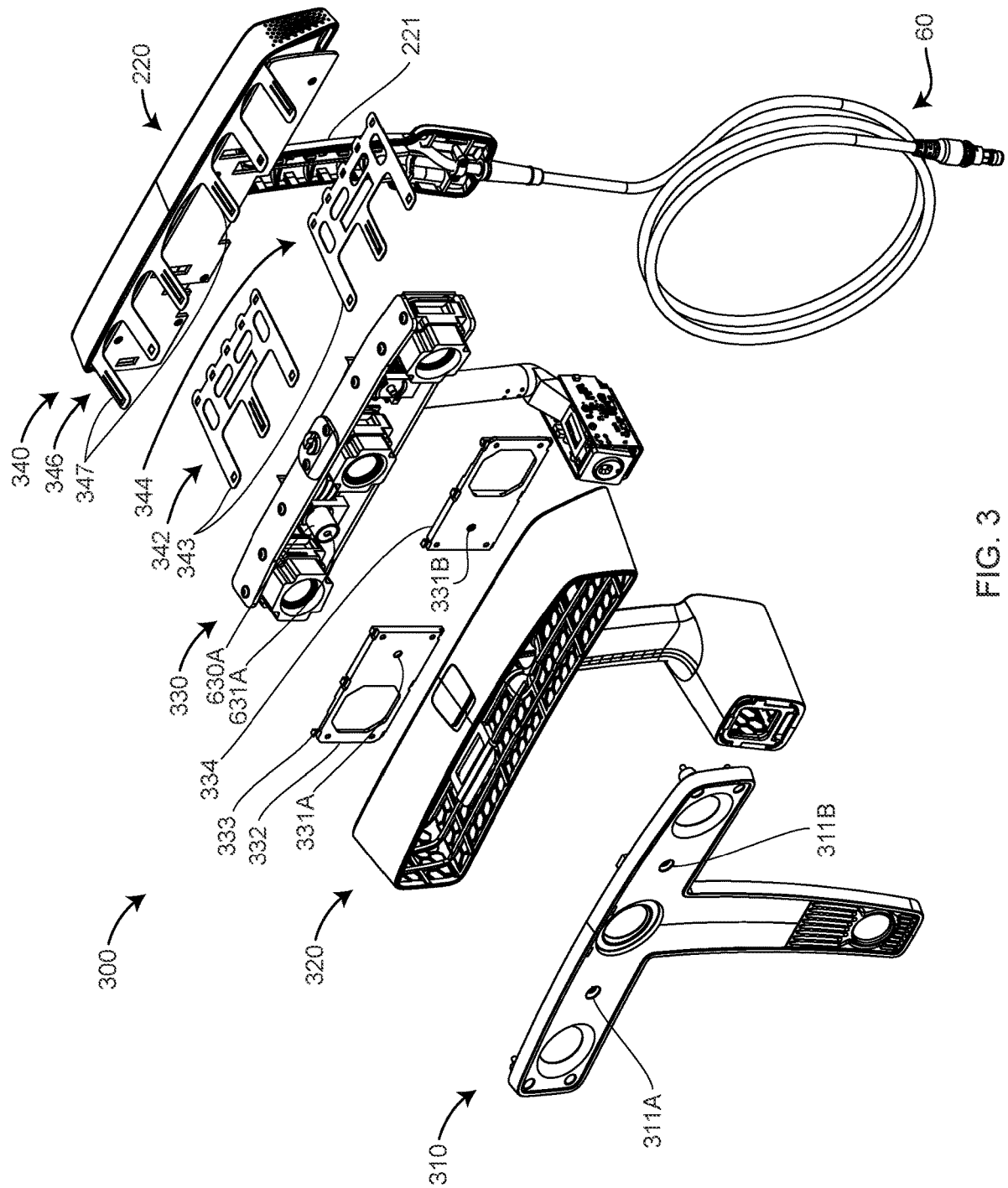
FIG. 3 is an exploded view of the 3D triangulation scanner according to an embodiment of the present invention.
Figure 4B:
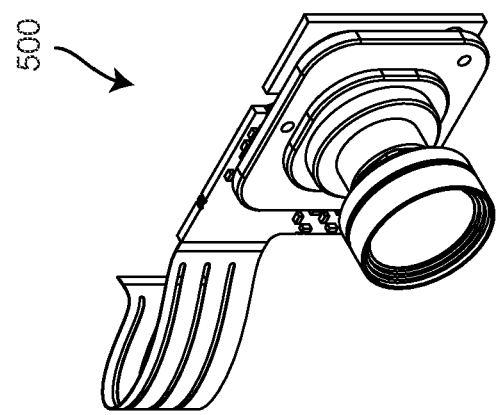
FIG. 4A and FIG. 4B are a front exploded isometric view and a front assembled isometric view, respectively, of a camera assembly according to an embodiment of the present invention.
Figure 4A:
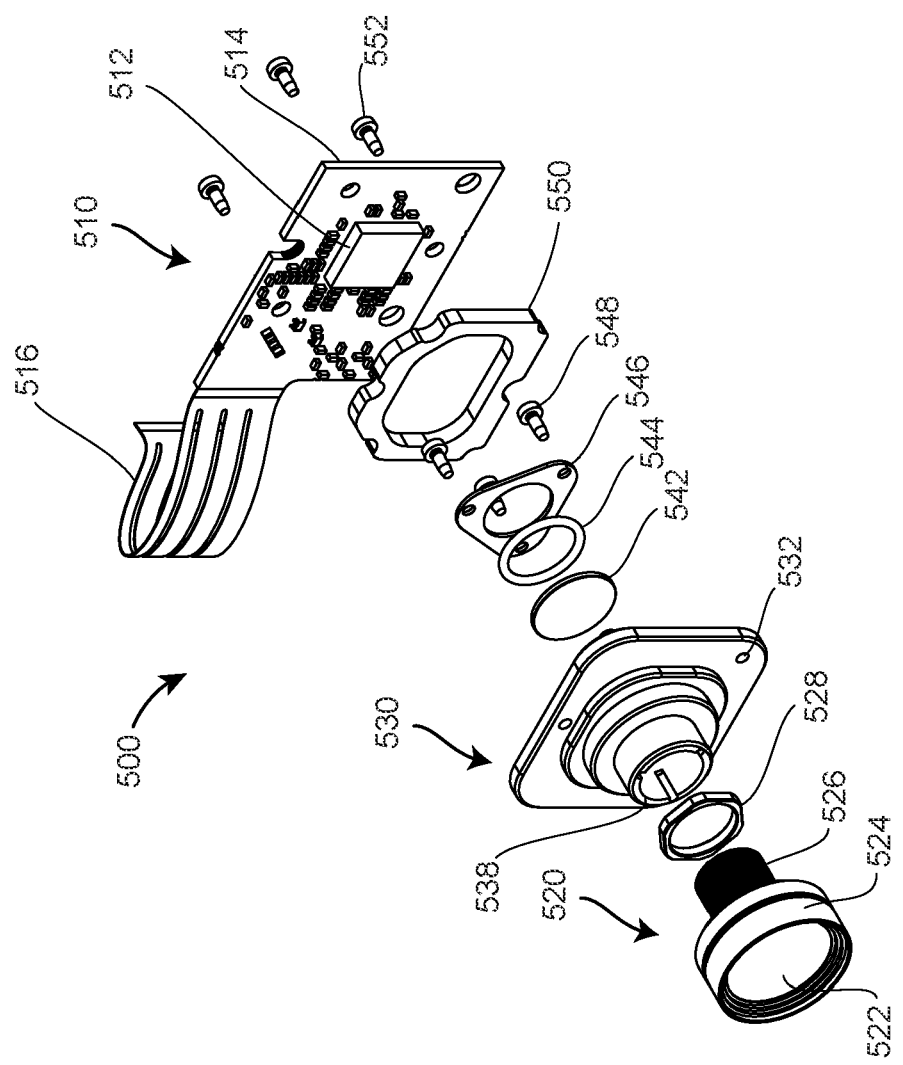
Figure 4C:
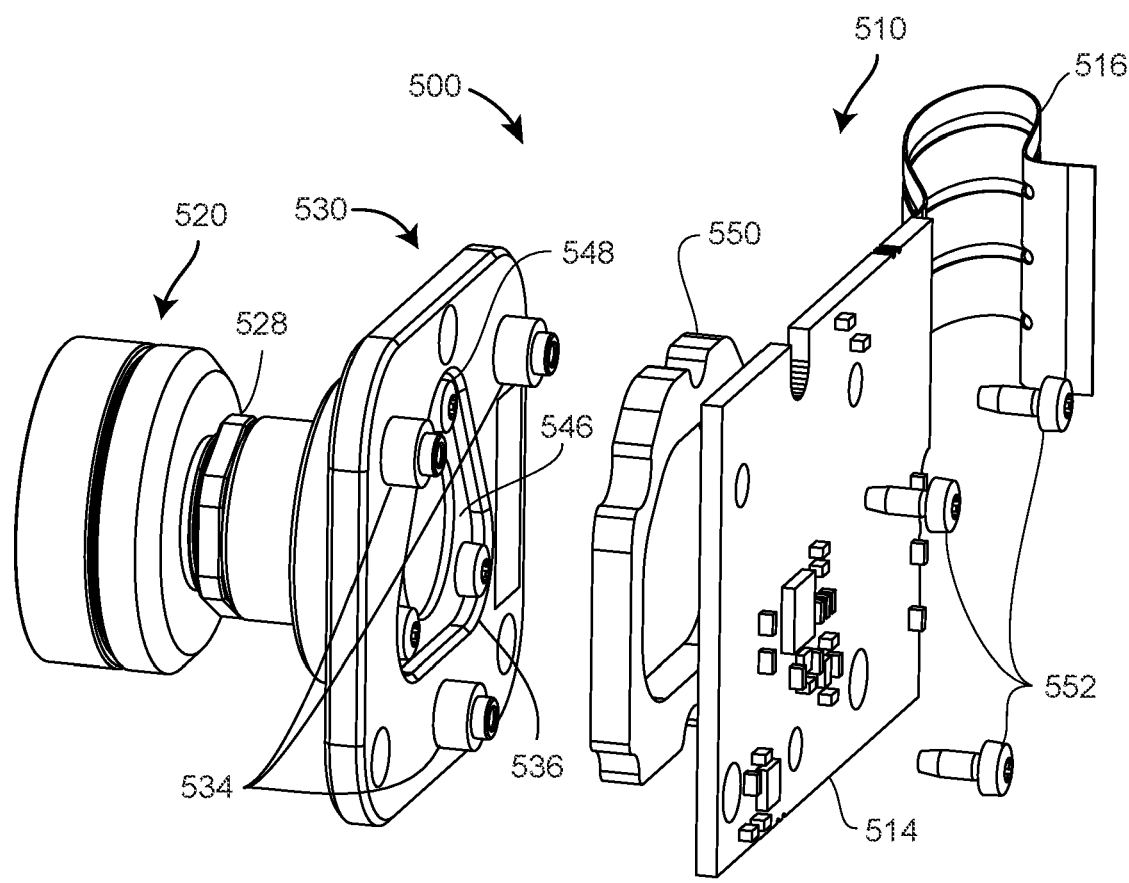
FIG. 4C and FIG. 4D are rear perspective exploded and partial cutaway views, respectively, of a camera assembly according to an embodiment of the present invention.
Figure 4D:
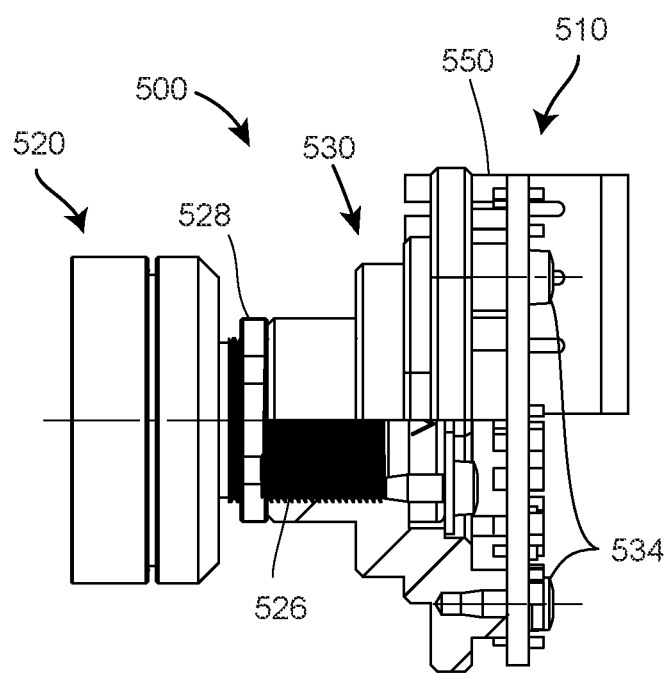

FIG. 3 is an exploded perspective view 300 of the scanner 10. In an embodiment, the scanner 10 includes faceplate assembly 310, handle cover assembly 320, carrying structure assembly 330, left cover plate 332, right cover plate 334, interlocking finger plates 342, 344, 346, rear assembly 340, and Ethernet cable 60.

FIGS. 4A, 4B, 4C, 4D are exploded front isometric, assembled front isometric, exploded rear perspective, and cutaway side views, respectively, of camera 500 according to an embodiment. The camera 500 includes a camera board 510 having a photosensitive array 512, a circuit board with supporting electrical components 514, and a ribbon cable 516. The camera 500 further includes lens assembly 520, lock washer 528, lens holder 530, optical filter 542, O-ring 544, filter clamp 546, screws 548, and gasket 550. Lens assembly 520 includes lens 522, lens housing 524, and lens threads 526. If the camera 500 is an IR camera such as the cameras 20, 40, the optical filter 542 is a relatively narrow optical passband filter selected to pass light emitted by the projector 50. In an embodiment, an IR camera includes a photosensitive array having more than one million pixels, a frame rate of 60 Hz, a bit depth of 10 bits, and a global shutter. If the camera 500 is the registration camera 30, then in an embodiment the photosensitive array 512 is a color array having red-green-blue (RGB) subpixel elements, and the optical filter 542 passes at least a portion of the visible spectrum. The lens holder 530 includes threaded screw holes 532, threaded standoffs 534, recess 536, and threaded sleeve 538. The filter 542 is held in place by O-ring 544 and filter clamp 546, which sit in recess 536 and are held in place with screws 548. Gasket 550, which sits between the circuit board 514 and the lens holder 530, is held in place by the threaded standoffs 534. The circuit board 514 is held in place by the screws 552. The gasket 550 keeps dirt from reaching the surface of the photosensitive array 512. The lens threads screw into the threaded sleeve 538 and is locked in place by the lock washer 528. The position of the lock washer 526 on the lens thread 526 is set by a factory procedure in according to the position at which the lens assembly 520 brings a target into focus at a predetermined distance from the camera 500.

Figure 5A:
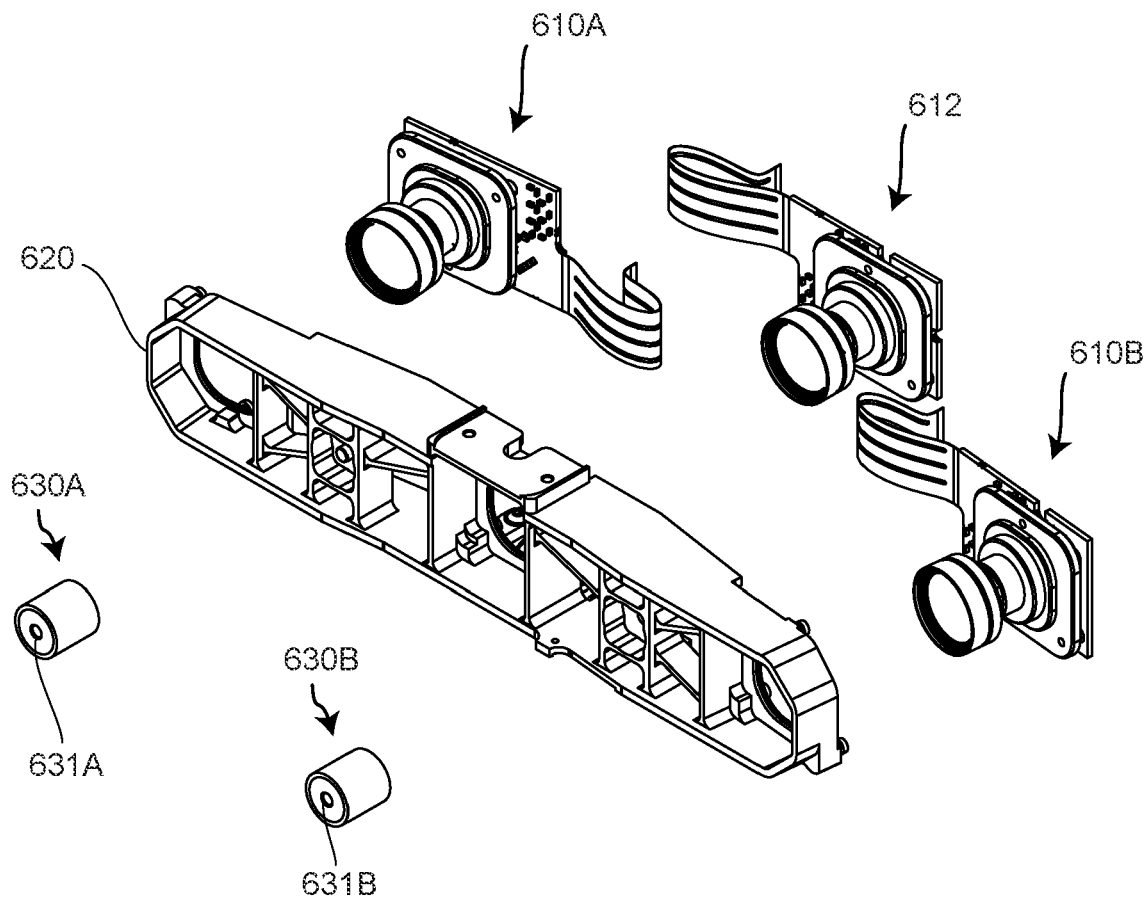
FIG. 5A and FIG. 5B are exploded isometric and assembled isometric views, respectively, of an aluminum integral carrying structure subassembly according to an embodiment of the present invention.
Figure 5B:
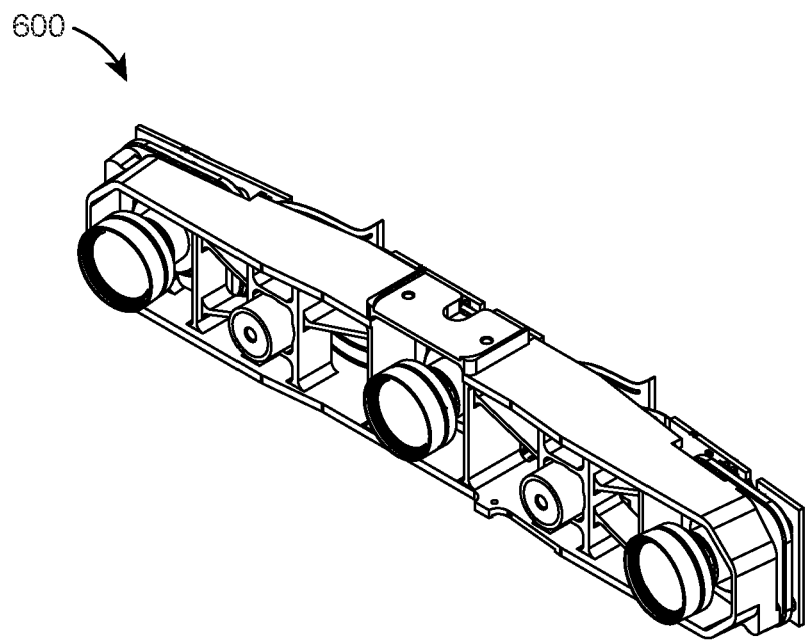

FIGS. 5A, 5B are exploded and assembled front isometric views of an aluminum upper subassembly 600 having a single aluminum structural component 620. Attached to the structural component 620 are IR cameras 610A, 610B and registration camera 612.

In an embodiment, software run on a processor coupled to the triangulation scanner 10 provides a signal or alert (such as a warning message) when a compensation procedure may be performed. In one embodiment, the software determines that a compensation procedure is to be performed whenever there is a predetermined change (e.g., 5 degrees Celsius) in the temperature of the scanner 10 following the last scanner calibration. In an embodiment, the scanner temperature is measured by temperature sensors within the scanner 10. In another embodiment, the software determines that a compensation procedure is to be performed whenever there is a predetermined inconsistency in measured results as determined using at least one method described herein. Such inconsistencies may be found, for example, by using two cameras and a projector mounted in a triangular pattern, as in FIG. 1, based on epipolar geometry. The self-consistency requirements of epipolar geometry are described below in reference to FIGS. 15, 16.

Referring back to FIG. 3, a method for attaching the carrying structure assembly 330 within the overall structure of the triangulation scanner 10 is now described. In an embodiment, the carrying structure assembly 330 in FIG. 3 rigidly supports the camera and projector elements. In an embodiment, elements that surround the carrying structure are designed to reduce or minimize forces applied to the carrying structure assembly 330. In this way, stability of the carrying structure assembly 330 is improved when there are changes in ambient temperature or changes in forces such as gravitational forces on the triangulation scanner 10. Gravitational forces may result from a change in direction of the 3D triangulation scanner 10, for example, when the triangulation scanner is turned upside down on turned on its side.

In an embodiment, the left cover plate 332 and the right cover plate 334 in FIG. 3 each have six connection features 333. The bottom three connection features of the left cover plate 332 each attach to one of the fingers 343 of the finger plate 342, and the bottom three connection features of the right cover plate 334 each attach to one of the fingers 343 of the finger plate 344. The finger plates 342, 343 attach to the perforated rear cover 220, one on each side of the rear cover extension 221. In an embodiment, the top three connection features of the left cover plate 332 each attach to one of the fingers 347 of the finger plate 346, and the top three connection features of the right cover plate 334 each attach to one of the fingers 347 of the finger plate 346. The fingerplate 346 is attached to the perforated rear cover 220.

The combination of the cover plates 332, 334, the finger plates 342, 344, 346, and the perforated rear cover 220 form a box-like structure, three sides of which are formed of thin sheet metal. The cover plates 332, 334 are attached to bumpers 630A, 630B (FIGS. 3, 6A) with fasteners that pass-through holes 311A, 311B, 331A, 331B and screw into tapped holes 631A, 631B.

The enclosure 80 includes the outermost components of the scanner 10 such as the perforated rear cover 220, the handle cover assembly 320, and the faceplate assembly 310. Within the enclosure are a number of elements such as cover plates 332, 334 and bumpers 630A, 630B that hold the carrying structure assembly 330 in a manner that allows the carrying structure assembly 330 to "float" within the enclosure 80, thereby reducing or minimizing changes among the relative positions and orientations of the cameras 20, 30, 40 and projector 50. It has been found that this loose coupling of the rigid carrying structure and other components thereby provides more stable measurements.

Figure 6:
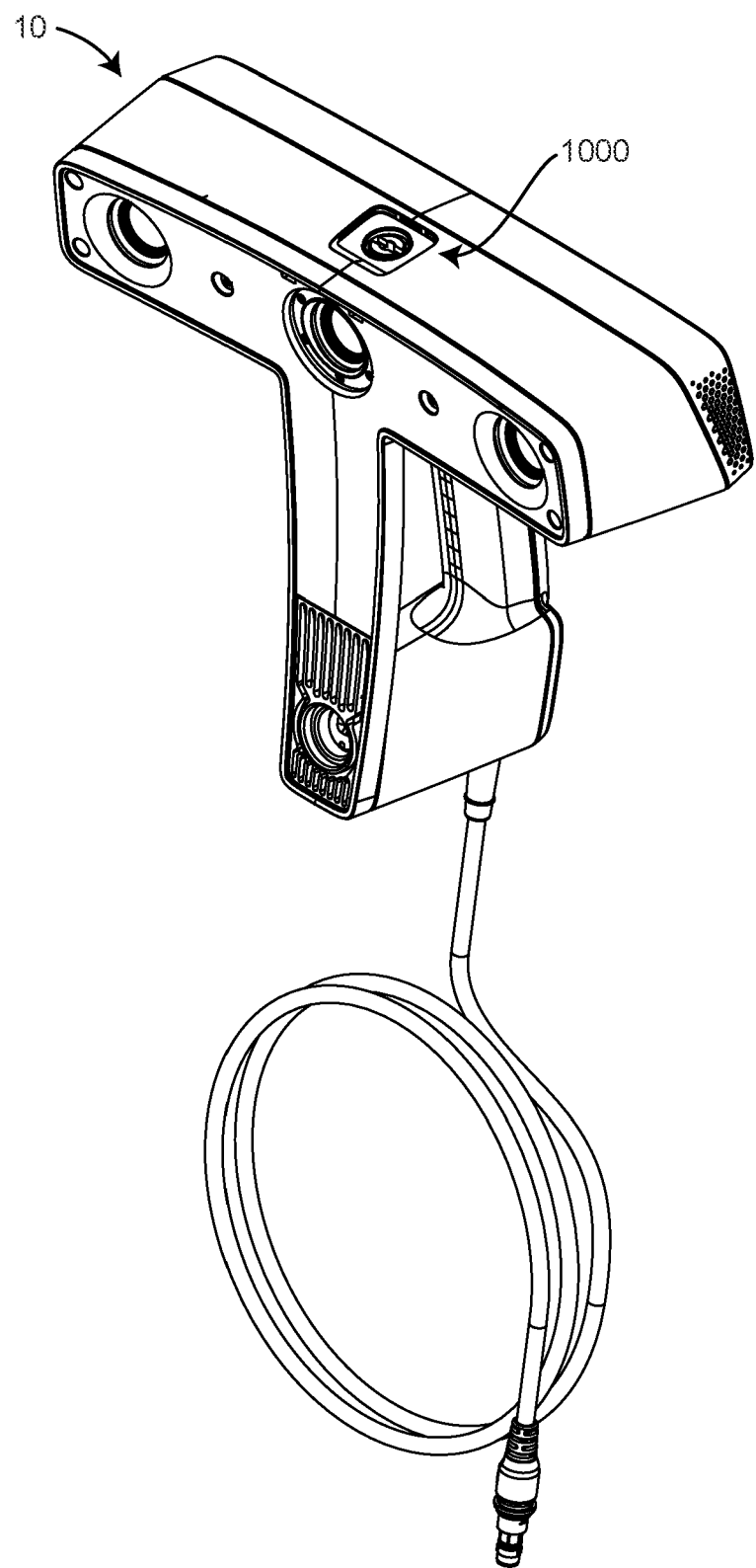
FIG. 6 is a front perspective view of the 3D triangulation scanner showing an accessory interface according to an embodiment of the present invention.

In embodiments, several types of accessories are attached to the accessory interface 1000 shown in FIG. 6. Such devices include but are not limited to: a color camera, a laser line generator, a mobile phone, an inertial measurement unit (IMU), a global positioning system (GPS), a robot arm, a target, and a projector. In an embodiment, the accessory color camera provides high-resolution color images that are used to colorize the 3D scan data provided by the scanner 10 or to add annotation data to displayed images.

In an embodiment, the laser line generator is attached to the accessory interface 1000. In an embodiment, the laser line generator produces a line of laser light that is imaged by the built-in registration camera 30 (FIG. 1) to add line scanning functionality to the scanner 10. In an embodiment, the laser line is projected in a plane that intersects a line connecting the cameras 20, 30, 40 in FIG. 1. The pattern of the projected line of light as captured by the two-dimensional array of the registration camera 30 is used by a processor to perform triangulation calculations that give the 3D coordinates of object points intersected by the line of light. In another embodiment, the cameras 20, 40 are further used to image the projected line of light.

In an embodiment, a mobile computing device, such as a cellular telephone for example, is added to the accessory interface 1000. Sensors within the mobile computing device such as the GPS, IMU, camera, and so forth can be used to assist in scan registration, tracking, data quality, augmented reality, and so forth.

In embodiments, dedicated sensors such as an IMU or a GPS are attached to the accessory interface 1000. Such sensors may have more accuracy or capability than those sensors found in a mobile computing device. In another embodiment, the scanner 10 is attached to a robot by the accessory interface 1000. In this case, the scanner 10 may be used to measure 3D coordinates at locations accessed by the robotic system.

In an embodiment, a target is added to the accessory interface 1000 to make the scanner 10 recognizable or trackable by other devices. For example, the target might be a retroreflector such as a cube-corner retroreflector, possibly embedded in a spherically mounted retroreflector. In this case, the target could be tracked by an optical measurement device such as a laser tracker device, for example. In another embodiment, the target is a six-degree-of-freedom (six-DOF) probe that is tracked by a six-DOF tracker in six degrees-of-freedom, thereby enabling the pose of the scanner 10 to be determined during movement of the probe. In other examples, the position of a target is determined by a camera system, such as a stereo camera system, for example. For the case in which there are several scanners in an environment, the target may provide a recognizable code that identifies the scanner 10. The target may also provide a way for a given target to be identified in the scan of a second scanner, allowing for easier registration.

In an embodiment, a projector is added to the accessory interface 1000. In an embodiment, the added projector emits patterns of light that provide additional information. For example, the projector may project computer aided design (CAD) data of known objects.

Figure 7A:
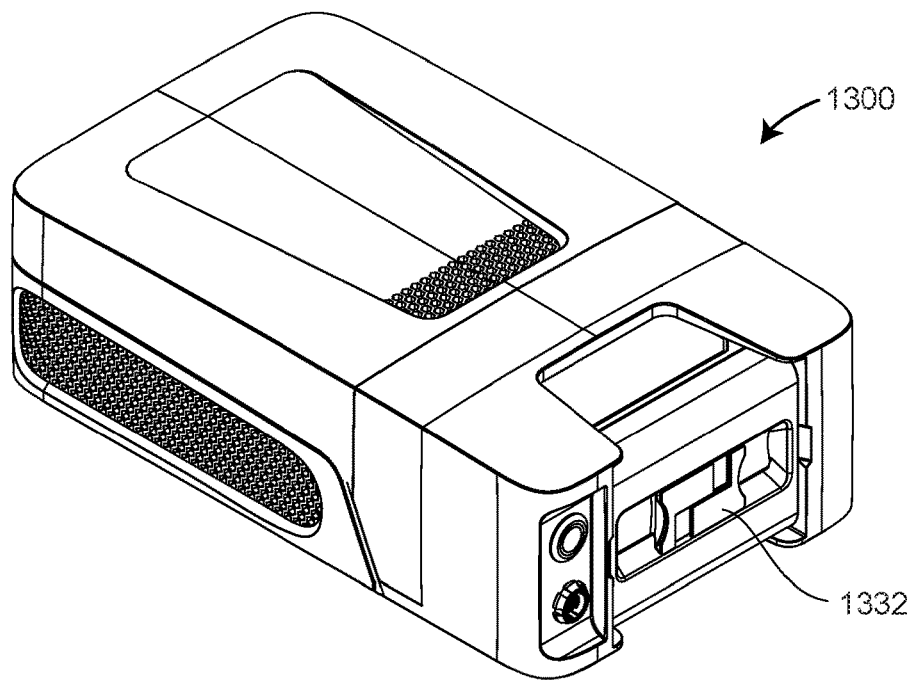
FIG. 7A and FIG. 7B are front perspective and front exploded perspective views of a mobile personal computer (PC) according to an embodiment of the present invention.
Figure 7B:
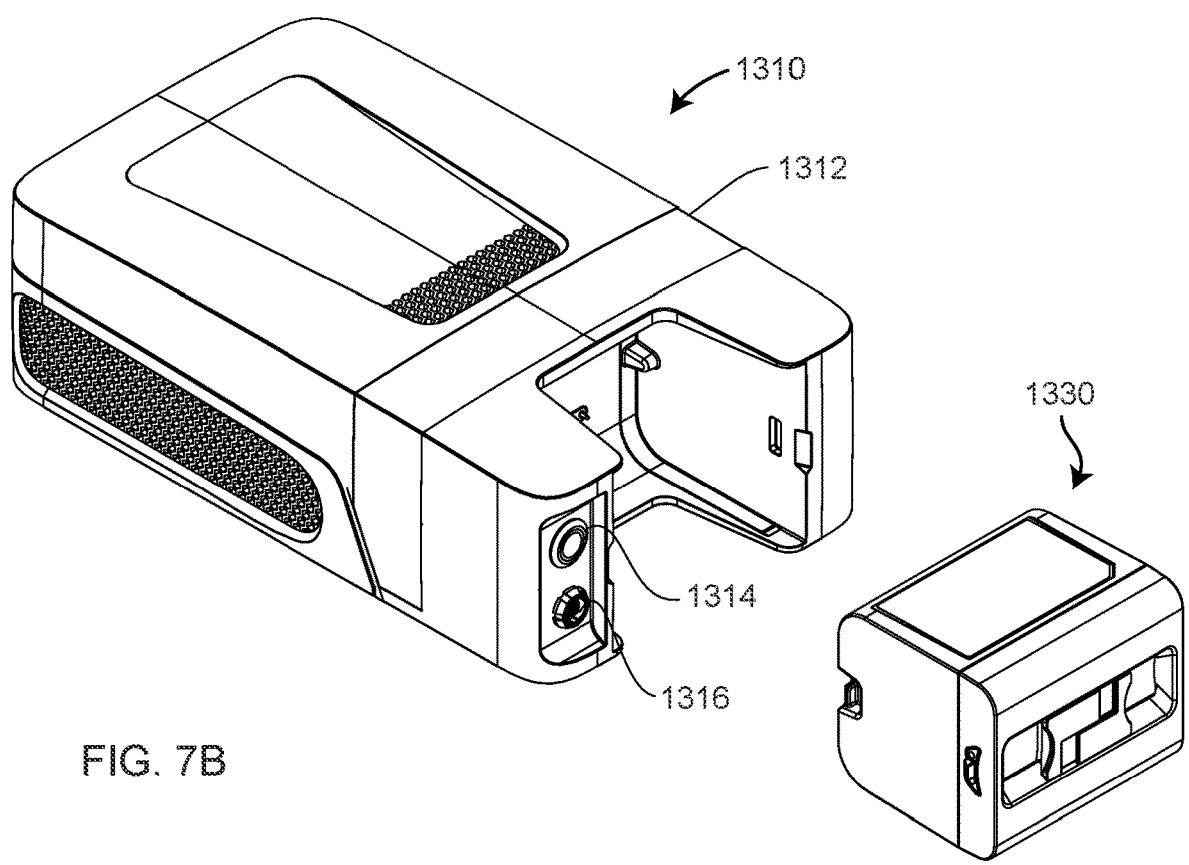

FIGS. 7A, 7B are isometric views of a mobile personal computer (PC) 1300 in a front isometric view and a front exploded isometric view, respectively. In an embodiment, the mobile PC 1300 includes a computing unit 1310 and a battery 1330. In an embodiment, the computing unit 1310 includes a body 1312, a power on-off button 1314, and connector 1316 that accepts the Ethernet cable 60. Ethernet is a family of computer networking technologies. It was first standardized in 1985 as IEEE 802.3. In an embodiment, the Ethernet port 1104 supports 1 gigabit per second, often referred to as Gigabit Ethernet. The battery 1330 includes a lock mechanism 1332 that may be squeezed inward to remove the battery from the body 1312.

Figure 8:
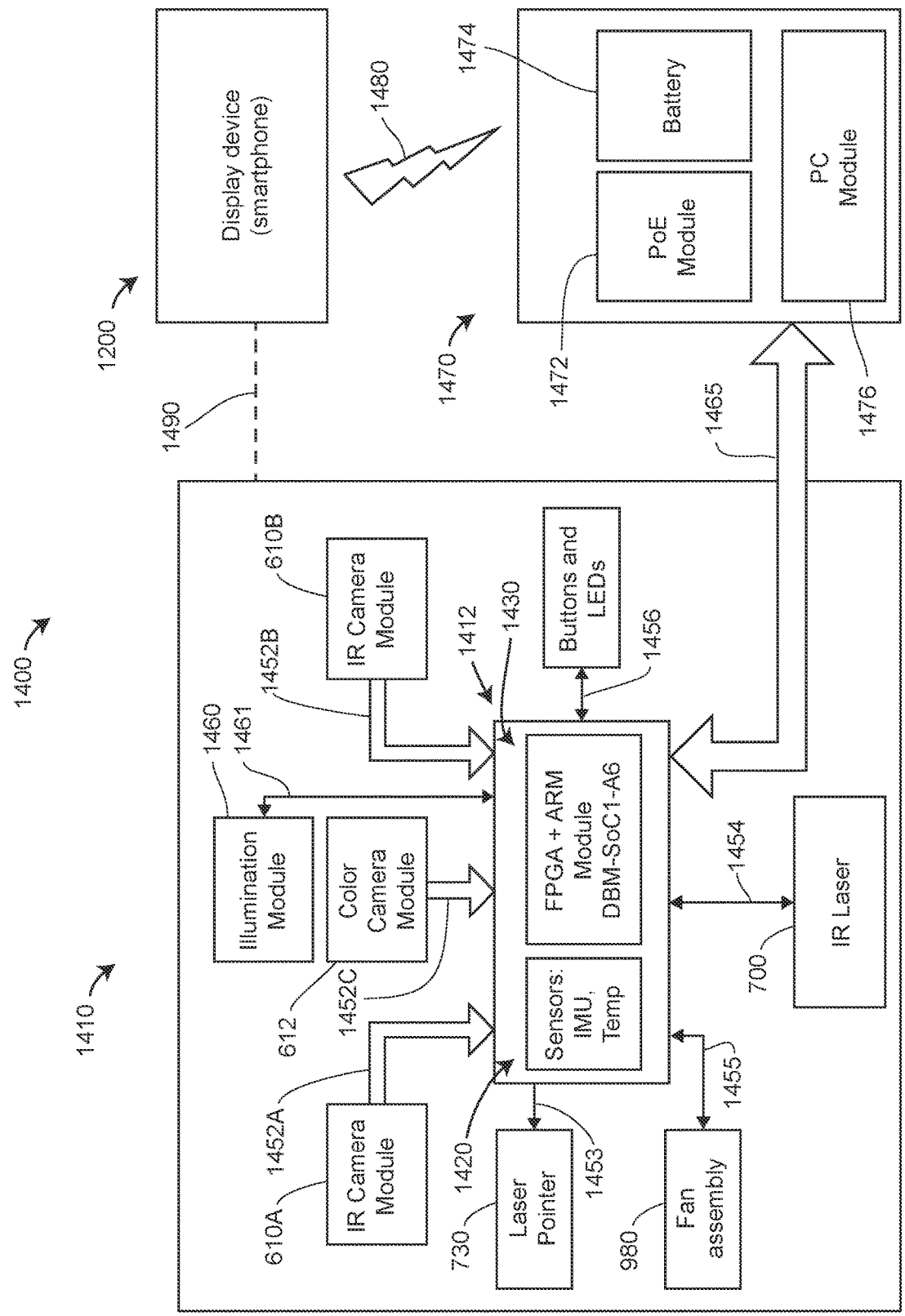
FIG. 8 and FIG. 9 are block diagrams of electronics coupled to the triangulation scanner according to an embodiment of the present invention.
Figure 9:
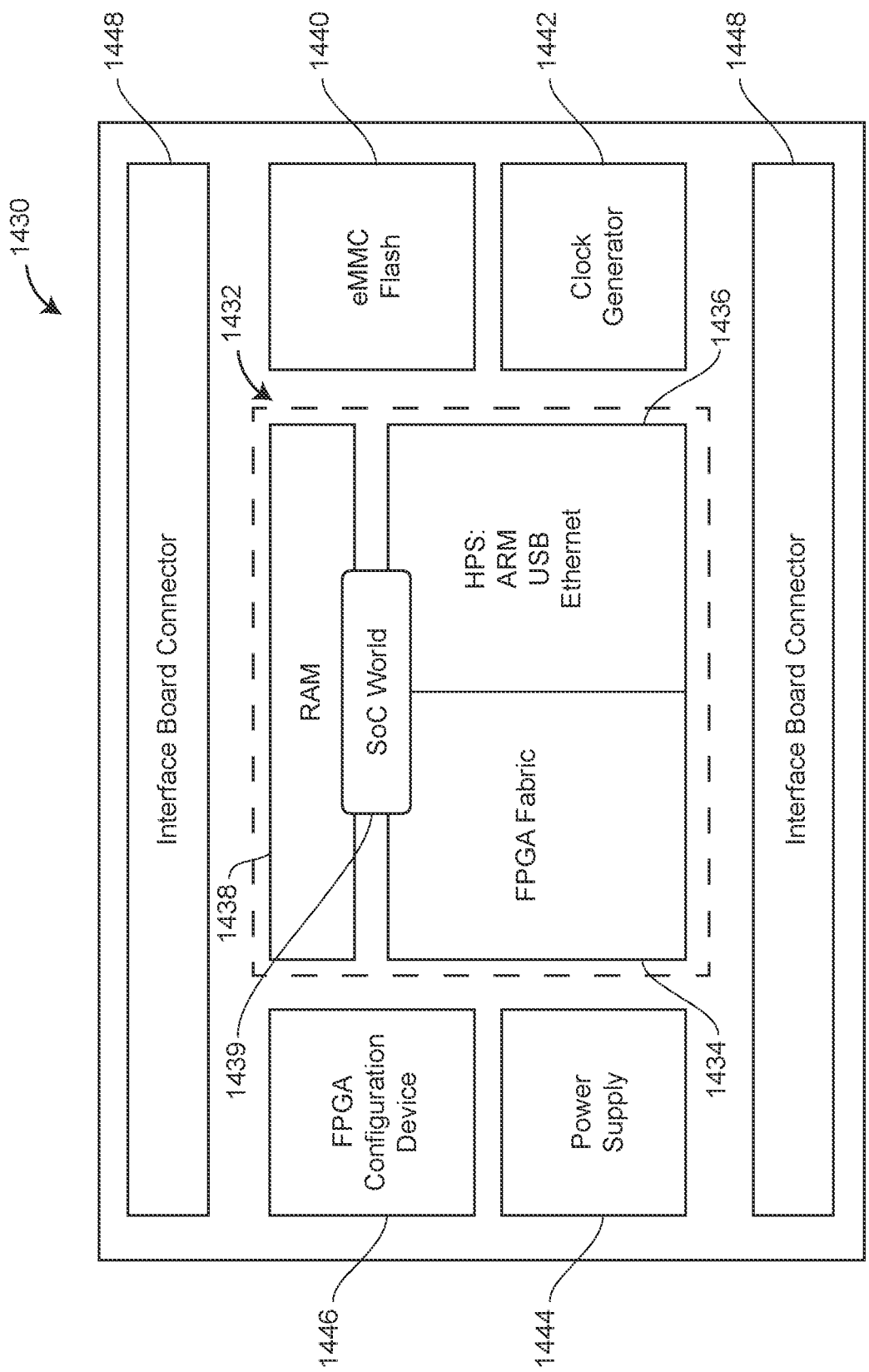
Figure 15:
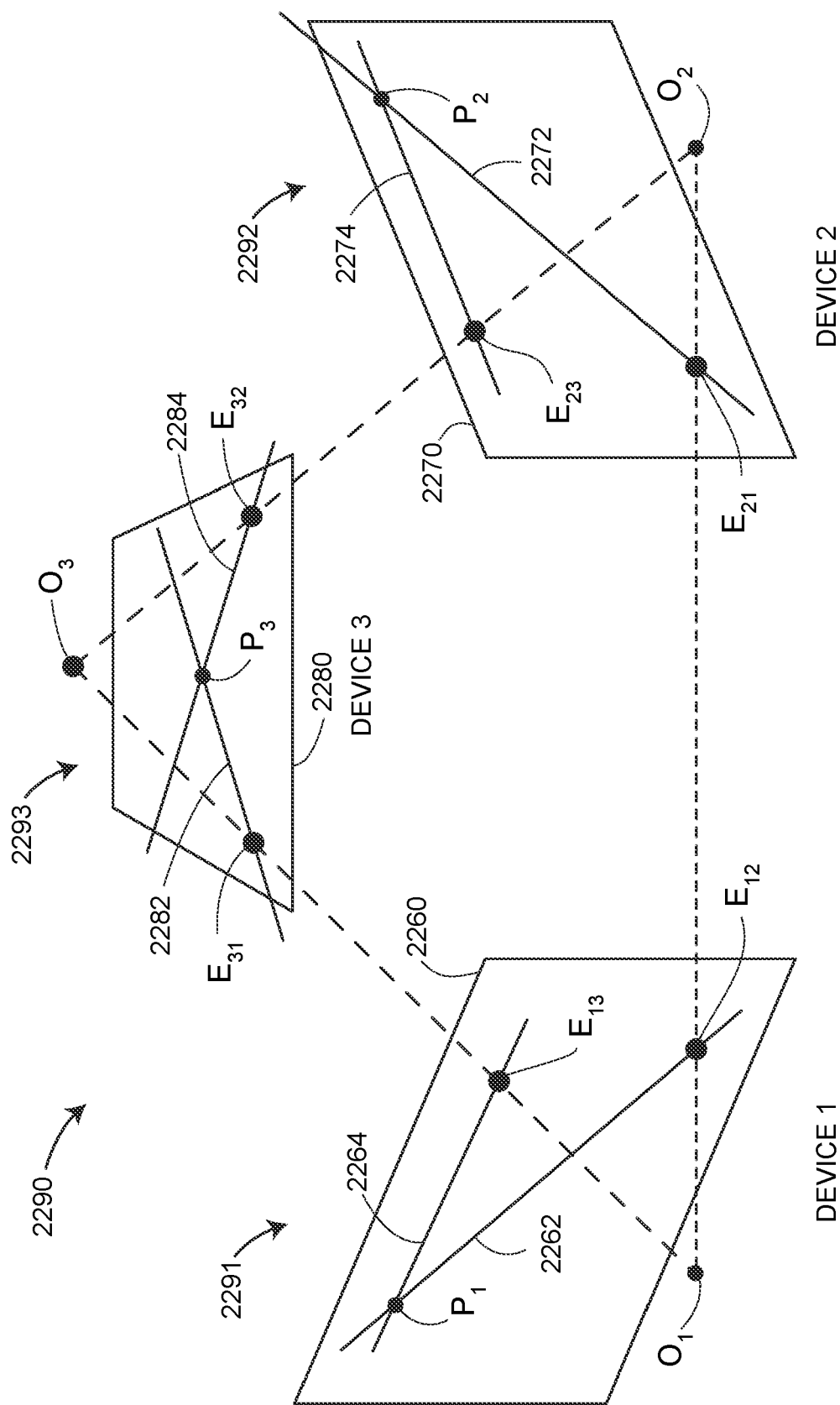
FIG. 15 is a schematic representation illustrating how epipolar relations may be advantageously used in when two cameras and a projector are placed in a triangular shape according to an embodiment of the present invention.

FIG. 8 is a block diagram of system electronics 1400 that in an embodiment is included in the scanner 10. In an embodiment, the electronics 1400 includes electronics 1410 within the handheld scanner 10, electronics 1470 within the mobile PC 1300, electronics within the mobile computing device 1200, electronics within other electronic devices such as accessories that attach to the accessory interface 1000, and electronics such as external computers that cooperate with the scanner system electronics 1400. In an embodiment, the electronics 1410 includes a circuit baseboard 1412 that includes a sensor collection 1420 and a computing module 1430, which is further shown in FIG. 15. In an embodiment, the sensor collection 1420 includes an IMU and one or more temperature sensors. In an embodiment, the computing module 1430 includes a system-on-a-chip (SoC) field programmable gate array (FPGA) 1432. In an embodiment, the SoC FPGA 1432 is a Cyclone V SoC FPGA that includes dual 800 MHz Cortex A9 cores, which are Advanced RISC Machine (ARM) devices. The Cyclone V SoC FPGA is manufactured by Intel Corporation, with headquarters in Santa Clara, California. FIG. 15 represents the SoC FPGA 1432 in block diagram form as including FPGA fabric 1434, a Hard Processor System (HPS) 1436, and random-access memory (RAM) 1438 tied together in the SoC 1439. In an embodiment, the HPS 1436 provides peripheral functions such as Gigabit Ethernet and USB. In an embodiment, the computing module 1430 further includes an embedded MultiMedia Card (eMMC) 1440 having flash memory, a clock generator 1442, a power supply 1444, an FPGA configuration device 1446, and interface board connectors 1448 for electrical communication with the rest of the system.

Signals from the infrared (IR) cameras 610A, 610B and the registration camera 612 are fed from the camera boards 510 through ribbon cables. Image signals 1452A, 1452B, 1452C from the ribbon cables 516 are processed by the computing module 1430. In an embodiment, the computing module 1430 provides a signal 1453 that initiates emission of light from the laser pointer 730. A TE control circuit communicates with the TE cooler within the infrared laser 700 through a bidirectional signal line 1454. In an embodiment, the TE control circuit is included within the SoC FPGA 1432. In another embodiment, the TE control circuit is a separate circuit on the baseboard 1412. A control line 1455 sends a signal to the fan assembly 980 to set the speed of the fans. In an embodiment, the controlled speed is based at least in part on the temperature as measured by temperature sensors within the sensor unit 1420. In an embodiment, the baseboard 1412 receives and sends signals to buttons 210, 211, 212 and their LEDs through the signal line 1456. In an embodiment, the baseboard 1412 sends over a line 1461 a signal to an illumination module 1460 that causes white light from LEDs to be turned on or off.

In an embodiment, bidirectional communication between the electronics 1410 and the electronics 1470 is enabled by Ethernet communications link 1465. In an embodiment, the Ethernet link is provided by the cable 60. In an embodiment, the cable 60 attaches to the mobile PC 1300, 1310 through the connector 1316 shown in FIGS. 7A, 7B. The Ethernet communications link 1465 is further operable to provide or transfer power to the electronics 1410 through the user of a custom Power over Ethernet (PoE) module 1472 coupled to the battery 1474. In an embodiment, the mobile PC 1300 further includes a PC module 1476, which in an embodiment is an Intel® Next Unit of Computing (NUC) processor. The NUC is manufactured by Intel Corporation, with headquarters in Santa Clara, California. In an embodiment, the mobile PC 1470 is configured to be portable, such as by attaching to a belt and carried around the waist or shoulder of an operator.

Figure 10:
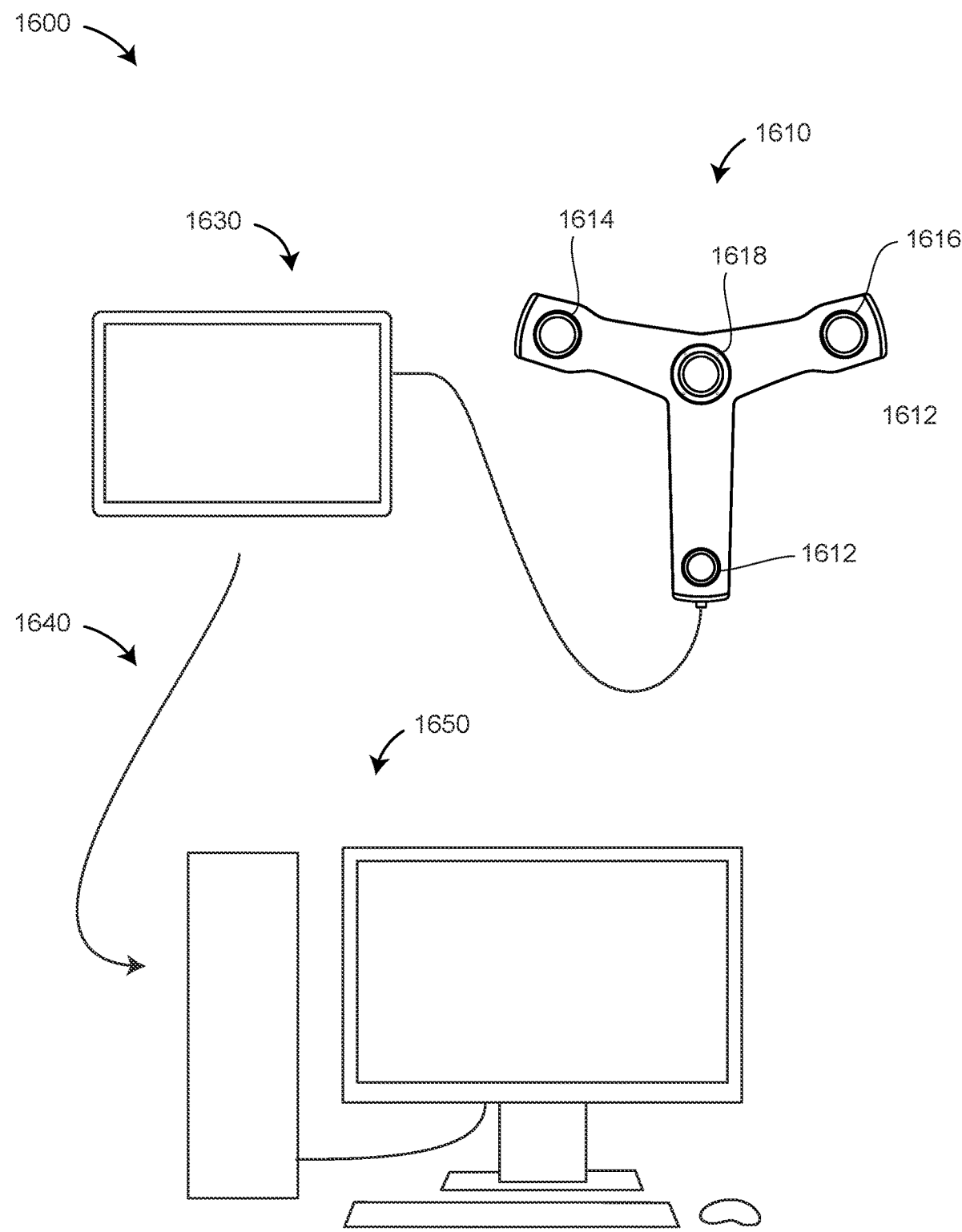
FIG. 10 is a schematic representation of a prior art handheld scanner and processing system.

FIG. 10 illustrates a prior-art scanner system 1600 for measuring 3D coordinates of an object. Included in the system is a 3D scanner 1610 and an accessory computer tablet 1630. In an embodiment, the 3D scanner 1610 includes a projector 1612, a first camera 1614, a second camera 1616, and a registration camera 1618. The accessory computer tablet 1630 performs real-time processing of scan data, as well as post-processing of scan data. In an embodiment, the computer 1630 has the capability of performing more complex application functions such as registering of multiple completed scans. In most cases, the relatively challenging requirements of application functions has led to those applications being performed on a workstation 1650. In an embodiment, data 1640 is transferred to the workstation 1650 using a removable flash memory card such as a microSD card.

In an embodiment, the display for the scanner system is provided by a mobile computing device, such as a cellular telephone with a microprocessor or smart phone for example. In an embodiment illustrated in FIGS. 11A, 11B, the mobile computing device 1200 is attached to the rear of the scanner 10. The display of the mobile computing device 1200 may obtain image data from the electronics 1470 of the mobile PC in either of two ways.

Figure 11A:
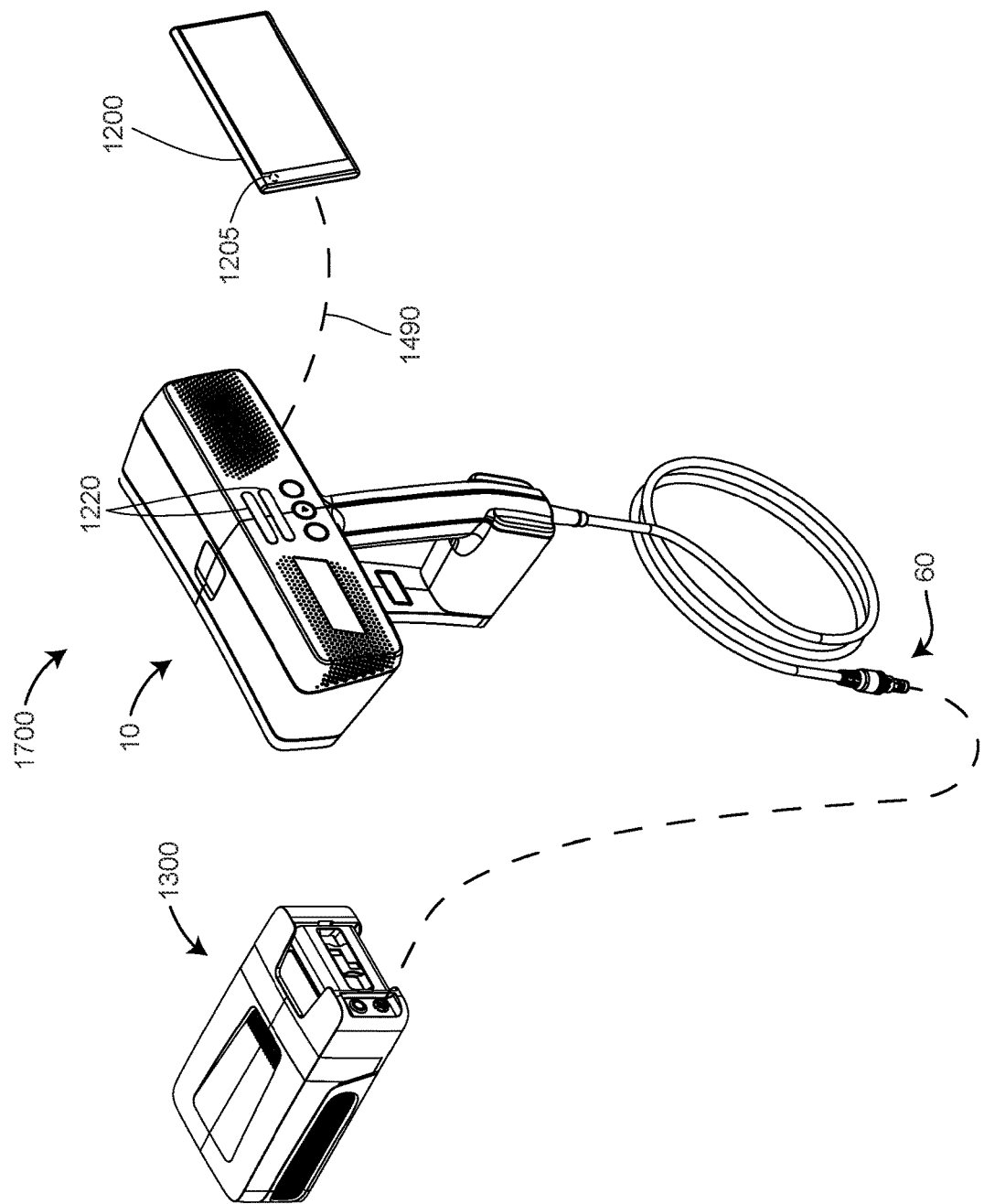
FIG. 11A illustrates a method of interconnecting a mobile PC with a mobile display using USB tethering according to an embodiment of the present invention.

In a first way 1700 illustrated schematically in FIG. 11A, communication between the display device 1200 and the mobile PC 1300 is by cable. A USB cable connects the mobile phone to the scanner 10, for example, through a USB cable 1490 (FIGS. 8, 11A). Using USB tethering, the mobile display 1200 is connected to the mobile PC 1300 by the Ethernet cable 60 that provides Ethernet link 1465.

Figure 11B:
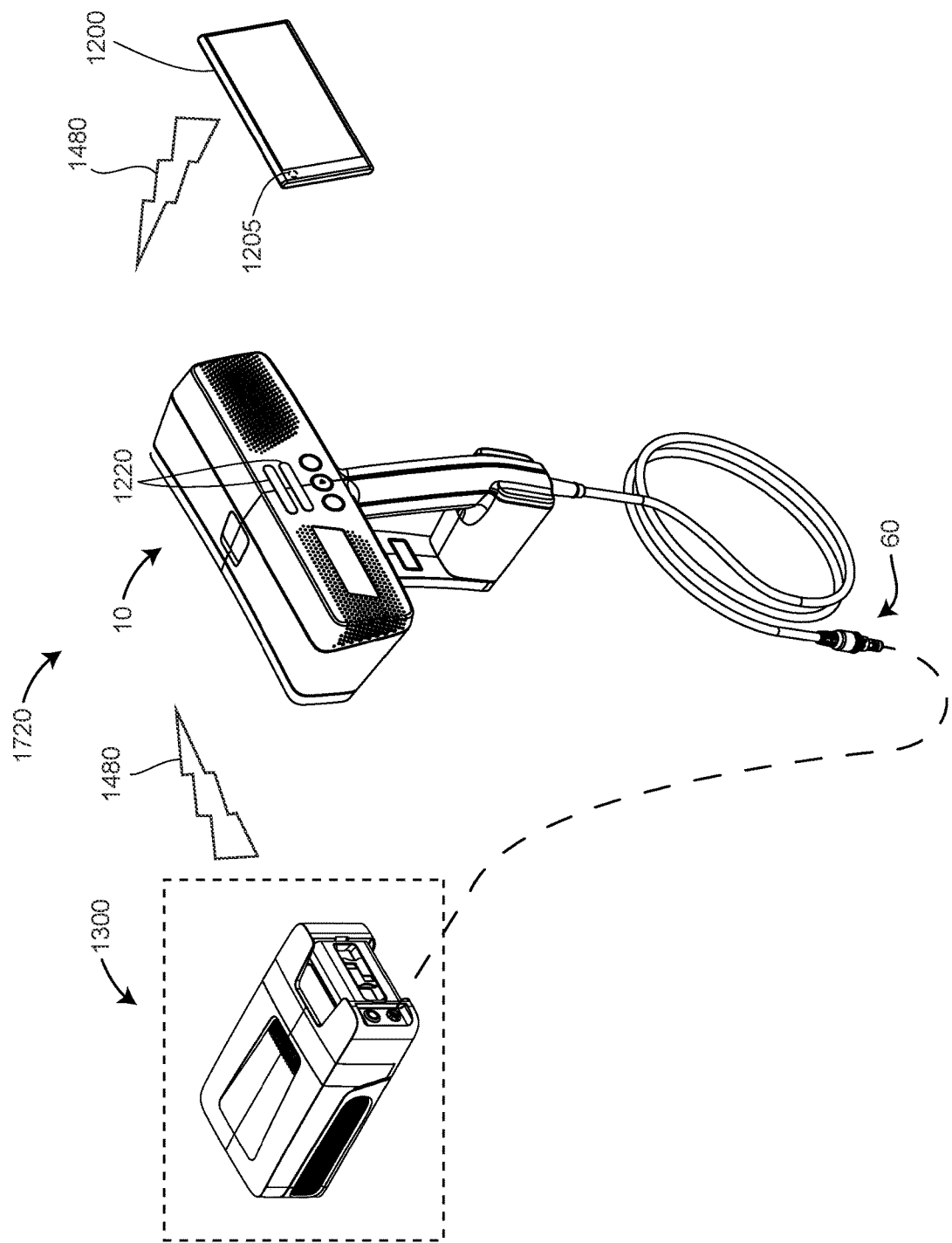
FIG. 11B illustrates a method of interconnecting a mobile PC with a mobile display using a Wi-Fi access point according to an embodiment of the present invention.

In a second way 1720 illustrated schematically in FIG. 11B, communication between the display device 1200 and the mobile PC 1300 is by wireless communication 1480 such as by Wi-Fi 802.11 ac. Wi-Fi 802.11 ac is a wireless networking standard in the IEEE 802.11 family developed in the IEEE Standards Association and marketed under the brand name Wi-Fi, a trademark of the Wi-Fi Alliance. Wi-Fi 802.11 ac provides high throughput in wireless local area networks (WLANS) on the 5 GHz band. It provides at least 1 gigabit per second of multi-station throughput and at least 500 megabits per second of single-link throughput. In an embodiment, the mobile PC 1300 is a Wi-Fi access point (AP) to which the mobile computing device connects. Data is transferred from the mobile PC 1300 to the mobile computing device 1200 or from the mobile computing device 1200 to the mobile PC 1300 through the Wi-Fi connection.

In an embodiment, the display device 1200 is held by a metallic adapter plate (not shown) to magnets (not shown) placed beneath rubber strips 1220. In another embodiment, the mobile computing device 1200 is affixed in a permanent or relatively repeatable location to the scanner 10. In an embodiment, the mobile computing device 1200 further includes a mobile-device camera 1205, which in an embodiment is a rear-facing camera as shown in FIGS. 11A, 11B. The rear-facing camera 1205 is not ordinarily visible from the front side of the mobile computing device 1200 and hence is indicated with dashed lines. In an embodiment, the mobile-device camera 1205 is used in addition to, or in place of, the registration camera 30. In an embodiment, the mobile-device camera 1205 is a zoom camera having operable to bring nearby or far away regions into focus.

A display 1740 may also be substituted for the display 1200 as illustrated in FIG. 11C. In an embodiment, the mobile PC 1300 is connected to the display 1740 by a High-Definition-Multimedia-Interface (HDMI) cable 1742 that attaches to the mobile PC 1300. Measurement results may be shown on the display 1740 using a web browser.

Figure 12:
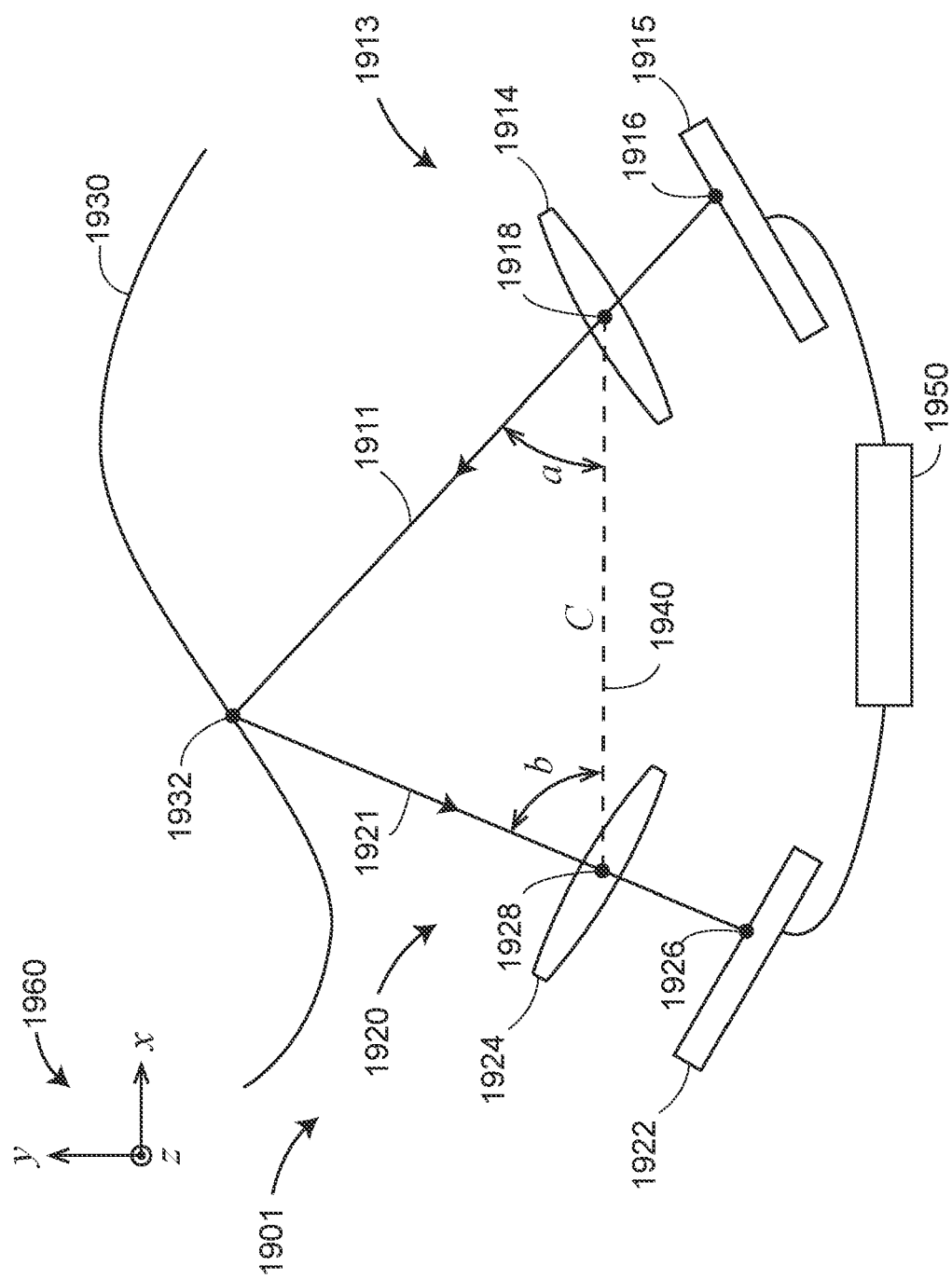
FIG. 12 is a schematic representation of a triangulation scanner having a projector and a camera according to an embodiment.

FIG. 12 shows a triangulation scanner (3D imager) 1901 that projects a pattern of light over an area on a surface 1930. The scanner 1901, which has a frame of reference 1960, includes a projector 1913 and a camera 1920. In an embodiment, the projector 1913 includes an illuminated projector pattern generator 1915, a projector lens 1914, and a perspective center 1918 through which a ray of light 1911 emerges. The ray of light 1911 emerges from a corrected point 1916 having a corrected position on the pattern generator 1915. In an embodiment, the point 1916 has been corrected to account for aberrations of the projector, including aberrations of the lens 1914, in order to cause the ray to pass through the perspective center 1918, thereby simplifying triangulation calculations. In an embodiment, the pattern generator 1915 includes a light source that sends a beam of light through a diffractive optical element (DOE). A beam of light from the infrared laser 700 passes through the DOE, which diffracts the light into a diverging pattern such as a diverging grid of spots. In an embodiment, one of the projected rays of light 1911 has an angle corresponding to the angle $\alpha$ in FIG. 12. In another embodiment, the pattern generator 1915 includes a light source and a digital micromirror device (DMD). In other embodiments, other types of pattern generators 1915 are used.

The ray of light 1911 intersects the surface 1930 in a point 1932, which is reflected (scattered) off the surface and sent through the camera lens 1924 to create a clear image of the pattern on the surface 1930 of a photosensitive array 1922. The light from the point 1932 passes in a ray 1921 through the camera perspective center 1928 to form an image spot at the corrected point 1926. The position of the image spot is mathematically adjusted to correct for aberrations of the camera lens. Correspondence is obtained between the point 1926 on the photosensitive array 1922 and the point 1916 on the illuminated projector pattern generator 1915. As explained herein below, the correspondence may be obtained by using a coded or an uncoded pattern of projected light. Once the correspondence is known, the angles $\alpha$ and b in FIG. 12 may be determined. The baseline 1940, which is a line segment drawn between the perspective centers 1918 and 1928, has a length C. Knowing the angles $\alpha$, b and the length C, all the angles and side lengths of the triangle 1928-1932-1918 may be determined. Digital image information is transmitted to a processor 1950, which determines 3D coordinates of the surface 1930. The processor 1950 may also instruct the illuminated pattern generator 1915 to generate an appropriate pattern.

Figure 13A:
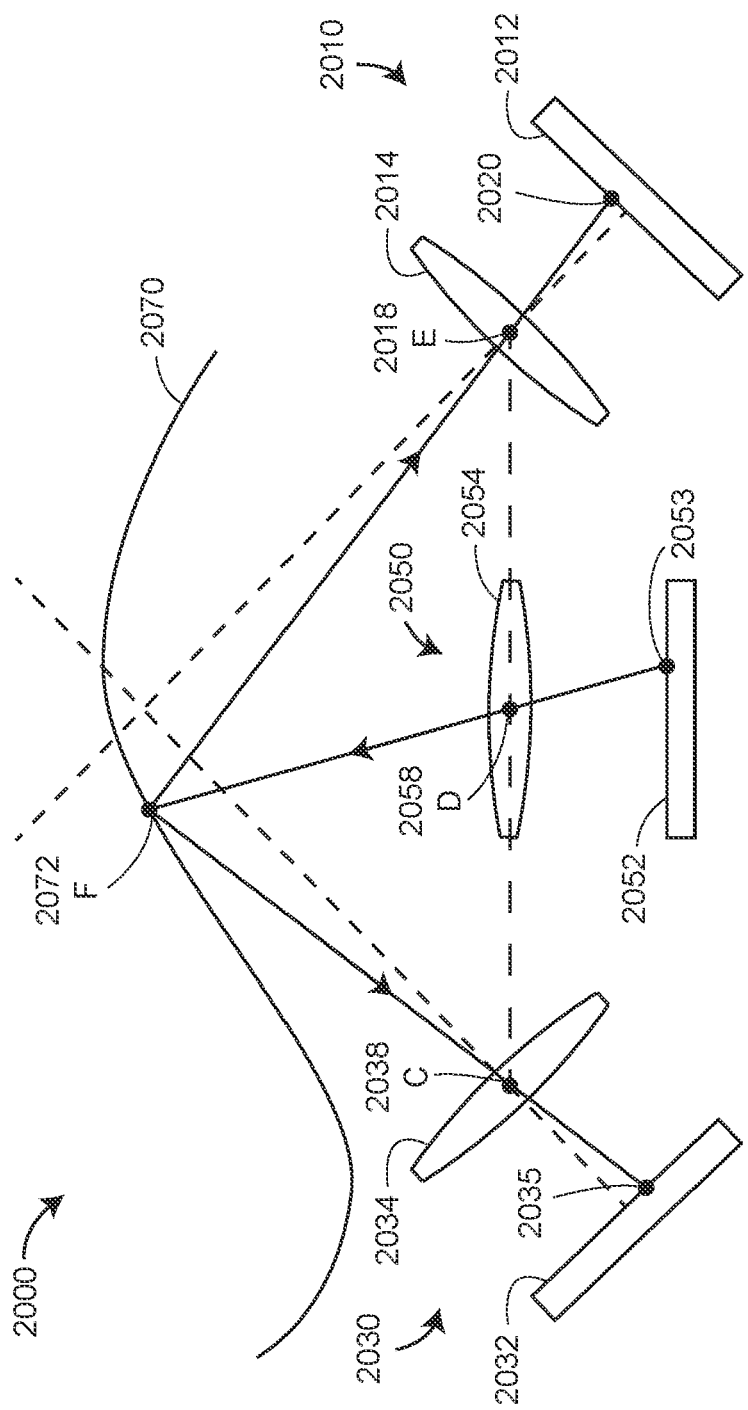
FIG. 13A is a schematic representation of a triangulation scanner having a projector and two cameras according to an embodiment of the present invention.

FIG. 13A shows a structured light triangulation scanner 2000 having a projector 2050, a first camera 2010, and a second camera 2030. The projector 2050 creates a pattern of light on a pattern generator 2052, which it projects from a corrected point 2053 of the pattern through a perspective center 2058 (point D) of the lens 2054 onto an object surface 2070 at a point 2072 (point F). In an embodiment, the pattern generator is a DOE that projects a pattern based on principles of diffractive optics. In other embodiments, other types of pattern generators are used. The point 2072 is imaged by the first camera 2010 by receiving a ray of light from the point 2072 through a perspective center 2018 (point E) of a lens 2014 onto the surface of a photosensitive array 2012 of the camera as a corrected point 2020. The point 2020 is corrected in the read-out data by applying a correction factor to remove the effects of lens aberrations. The point 2072 is likewise imaged by the second camera 2030 by receiving a ray of light from the point 2072 through a perspective center 2038 (point C) of the lens 2034 onto the surface of a photosensitive array 2032 of the second camera as a corrected point 2035. It should be understood that any reference to a lens in this document is understood to mean any possible combination of lens elements and apertures.

Figure 13B:
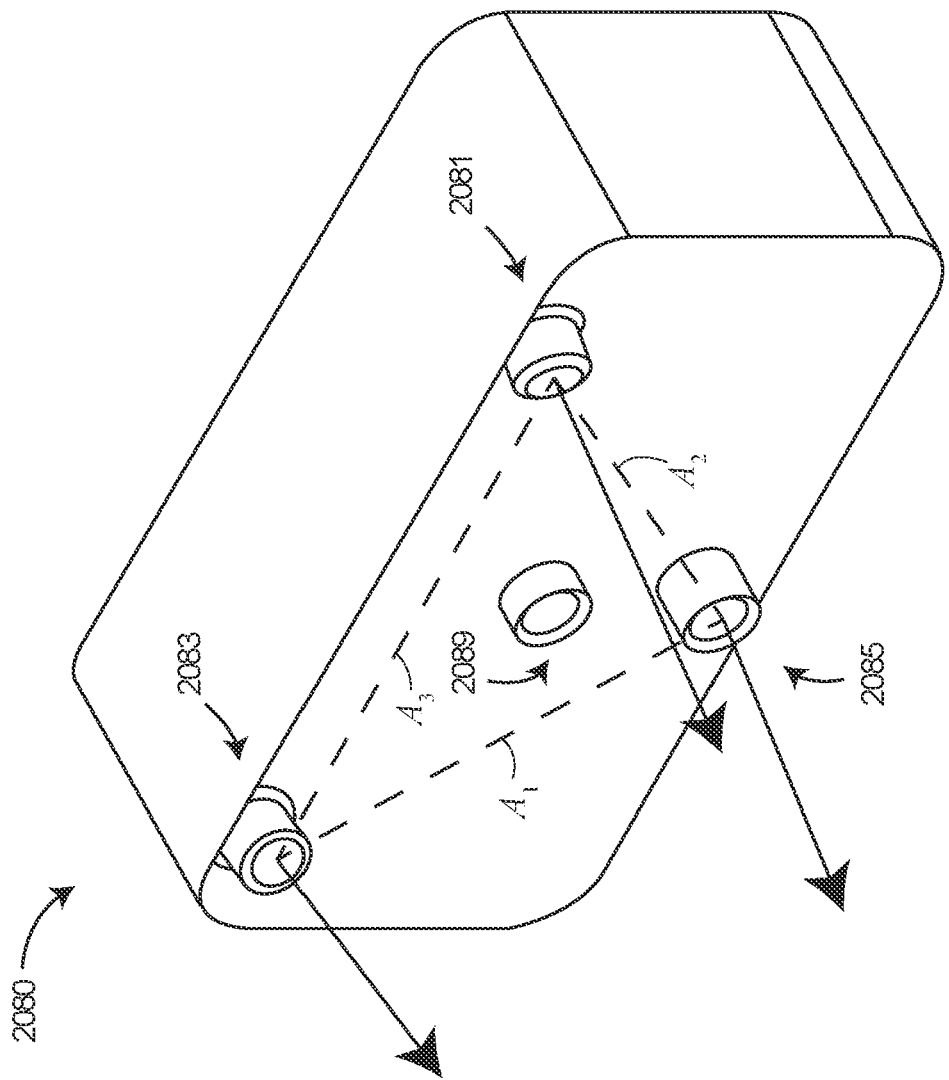
FIG. 13B is an isometric view of a triangulation scanner having a projector, two triangulation cameras, and a registration camera according to an embodiment of the present invention.

FIG. 13B shows 3D imager 2080 having two cameras 2081, 2083 and a projector 2085 arranged in a triangle $A_1$-$A_2$-$A_3$. In an embodiment, the 3D imager 2080 of FIG. 13B further includes a camera 2089 that may be used to provide color (texture) information for incorporation into the 3D image. In addition, the camera 2089 may be used to register multiple 3D images through the use of videogrammetry. This triangular arrangement provides additional information beyond that available for two cameras and a projector arranged in a straight line as illustrated in FIG. 13A. The additional information may be understood in reference to FIG. 14, which explains the concept of epipolar constraints, and FIG. 15, which explains how epipolar constraints are advantageously applied to the triangular arrangement of the 3D imager 2080. In an embodiment, the elements 2081, 2083, 2085, 2089 in FIG. 13B correspond to the cameras 40, 20, 50, 30 in FIG. 1.

Figure 14:
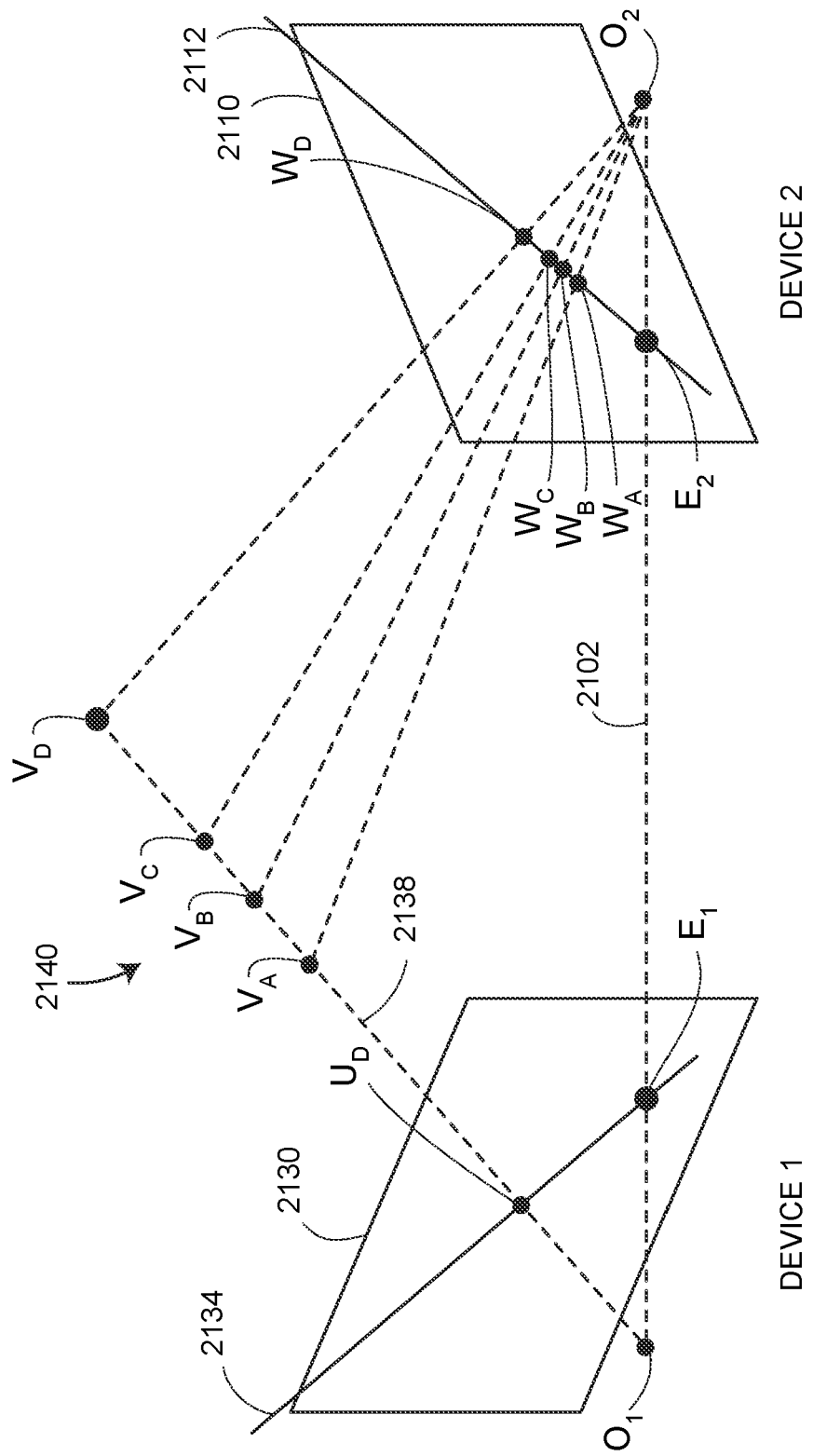
FIG. 14 is a schematic representation illustrating epipolar terminology.

In FIG. 14, a 3D triangulation instrument 2140 includes a device 1 and a device 2 on the left and right sides, respectively. Device 1 and device 2 may be two cameras or device 1 and device 2 may be one camera and one projector. Each of the two devices, whether a camera or a projector, has a perspective center, $O_1$ and $O_2$, and a reference plane, 2130 or 2110. The perspective centers are separated by a baseline distance B, which is the length of the line 2102 between $O_1$ and $O_2$. The perspective centers $O_1$, $O_2$ are points through which rays of light may be considered to travel, either to or from a point on an object. These rays of light either emerge from an illuminated projector pattern or impinge on a photosensitive array.

In FIG. 14, the device 1 has a perspective center $O_1$ and a reference plane 2130, where the reference plane 2130 is, for the purpose of analysis, equivalent to an image plane of the object point $O_1$ 2130. In other words, the reference plane 2130 is a projection of the image plane about the perspective center $O_1$. A device 2 has a perspective center $O_2$ and a reference plane 2110. A line 2102 drawn between the perspective centers $O_1$ and $O_2$ crosses the planes 2130 and 2110 at the epipole points $E_1$, $E_2$, respectively. Consider a point $U_D$ on the plane 2130. If device 1 is a camera, an object point that produces the point $U_D$ on the reference plane 2130 (which is equivalent to a corresponding point on the image) must lie on the line 2138. The object point might be, for example, one of the points $V_A$, $V_B$, $V_C$, or $V_D$. These four object points correspond to the points $W_A$, $W_B$, $W_C$, $W_D$, respectively, on the reference plane 2110 of device 2. This is true whether device 2 is a camera or a projector. It is also true that the four points lie on a straight line 2112 in the plane 2110. This line, which is the line of intersection of the reference plane 2110 with the plane of $O_1$-$O_2$-$U_D$, is referred to as the epipolar line 2112. It follows that any epipolar line on the reference plane 2110 passes through the epipole $E_2$. Just as there is an epipolar line on the reference plane 2110 of device 2 for any point $U_D$ on the reference plane of device 1, there is also an epipolar line 2134 on the reference plane 2130 of device 1 for any point on the reference plane 2110 of device 2.

FIG. 15 illustrates the epipolar relationships for a 3D imager 2290 corresponding to 3D imager 2080 of FIG. 13B in which two cameras and one projector are arranged in a triangular pattern. In general, the device 1, device 2, and device 3 may be any combination of cameras and projectors as long as at least one of the devices is a camera. Each of the three devices 2291, 2292, 2293 has a perspective center $O_1$, $O_2$, $O_3$, respectively, and a reference plane 2260, 2270, and 2280, respectively. Each pair of devices has a pair of epipoles. Device 1 and device 2 have epipoles $E_{12}$, $E_{21}$ on the planes 2260, 2270, respectively. Device 1 and device 3 have epipoles $E_{13}$, $E_{31}$, respectively on the planes 2260, 2280, respectively. Device 2 and device 3 have epipoles $E_{23}$, $E_{32}$ on the planes 2270, 2280, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the situation of FIG. 15 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 2260 to obtain the epipolar line 2264. Intersect the plane $P_2$-$E_{21}$-$E_{12}$ to obtain the epipolar line 2262. If the image point $P_1$ has been determined consistently, the observed image point $P_1$ will lie on the intersection of the calculated epipolar lines 2262 and 2264.

To check the consistency of the image point $P_2$, intersect the plane $P_3$-$E_{32}$-$E_{23}$ with the reference plane 2270 to obtain the epipolar line 2274. Intersect the plane $P_1$-$E_{12}$-$E_{21}$ to obtain the epipolar line 2272. If the image point $P_2$ has been determined consistently, the observed image point $P_2$ will lie on the intersection of the calculated epipolar lines 2272 and 2274.

To check the consistency of the projection point $P_3$, intersect the plane $P_2$-$E_{23}$-$E_{32}$ with the reference plane 2280 to obtain the epipolar line 2284. Intersect the plane $P_1$-$E_{13}$-$E_{31}$ to obtain the epipolar line 2282. If the projection point $P_3$ has been determined consistently, the projection point $P_3$ will lie on the intersection of the calculated epipolar lines 2282 and 2284.

The redundancy of information provided by using a 3D imager having three devices (such as two cameras and one projector) enables a correspondence among projected points to be established even without analyzing the details of the captured images and projected pattern features. Suppose, for example, that the three devices include two cameras and one projector. Then a correspondence among projected and imaged points may be directly determined based on the mathematical constraints of the epipolar geometry. This may be seen in FIG. 15 by noting that a known position of an illuminated point on one of the reference planes 2260, 2270, 2280 automatically provides the information needed to determine the location of that point on the other two reference planes. Furthermore, once a correspondence among points has been determined on each of the three reference planes 2260, 2270, 2280, a triangulation calculation may be performed using only two of the three devices of FIG. 15. A description of such a triangulation calculation is discussed in relation to FIG. 12.

Figure 16:
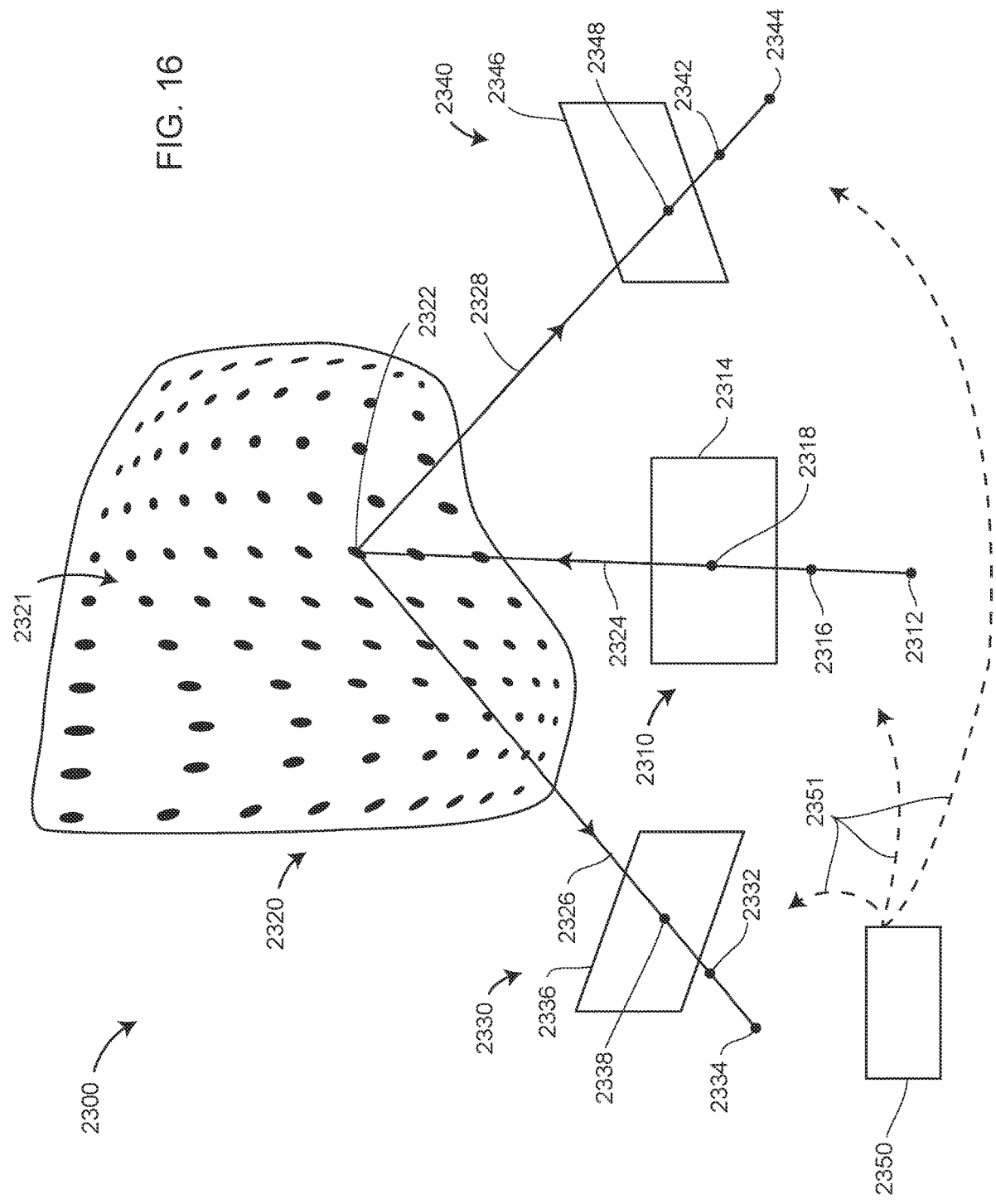
FIG. 16 illustrates a system in which 3D coordinates are determined for a grid of uncoded spots projected onto an object according to an embodiment of the present invention.

By establishing correspondence based on epipolar constraints, it is possible to determine 3D coordinates of an object surface by projecting uncoded spots of light. An example of projection of uncoded spots is illustrated in FIG. 16. In an embodiment, a projector 2310 projects a collection of identical spots of light 2321 on an object 2320. In the example shown, the surface of the object 2320 is curved in an irregular manner causing an irregular spacing of the projected spots on the surface. One of the projected points is the point 2322, projected from a projector source element 2312 and passing through the perspective center 2316 as a ray of light 2324 forms a point 2318 on the reference plane 2314.

The point or spot of light 2322 on the object 2320 is projected as a ray of light 2326 through the perspective center 2332 of a first camera 2330, resulting in a point 2334 on the image sensor of the camera 2330. The corresponding point on the reference plane 2336 is 2338. Likewise, the point or spot of light 2322 is projected as a ray of light 2328 through the perspective center 2342 of a second camera 2340, resulting in a point 2344 on the image sensor of the camera 2340. The corresponding point on the reference plane 2346 is 2348. In an embodiment, a processor 2350 is in communication with the projector 2310, first camera 2330, and second camera 2340 through communication links 2351, which may be wired or wireless communication links. The processor determines a correspondence among points on the projector 2310, first camera 2330, and second camera 2340. In an embodiment, the processor 2350 performs a triangulation calculation to determine the 3D coordinates of the point 2322 on the object 2320. An advantage of a scanner 2300 having three device elements, either two cameras and one projector or one camera and two projectors, is that correspondence may be determined among projected points without matching projected feature characteristics. In other words, correspondence can be established among spots on the reference planes 2336, 2314, and 2346 even without matching particular characteristics of the spots. The use of the three devices 2310, 2330, 2340 also has the advantage of enabling identifying or correcting errors in compensation parameters by noting or determining inconsistencies in results obtained from triangulation calculations, for example, between two cameras, between the first camera and the projector, and between the second camera and the projector. A compensation parameter can be at least one parameter of a camera model.

In an embodiment, in the scanner 10, one or more of the cameras 20, 30, 40 are auto-focus cameras that bring images into focus, enlarging or shrinking the relative size of objects seen on images captured by the cameras 20, 30, 40. Auto-focus provides an advantage in extending the range over which 3D measurements can accurately be made. Methods are now described for obtaining autofocus or otherwise compensating a scanner.

Figure 17:
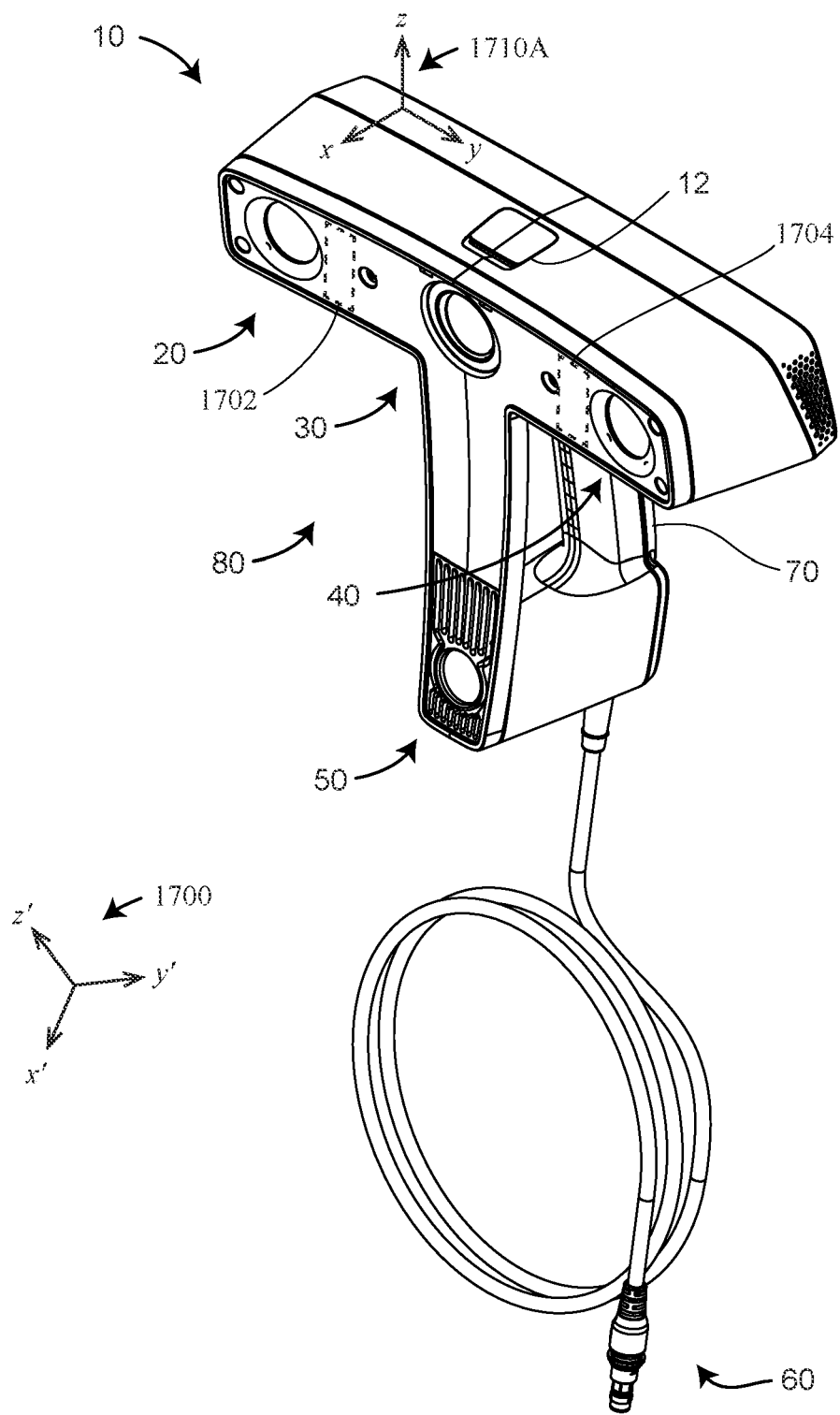
FIG. 17 is a front perspective view of a scanner indicating exemplary local and global coordinate systems according to an embodiment of the present invention.

The scanner 10 is said to have a "pose" that includes three translational degrees of freedom (such as x, y, z) and three orientational degrees of freedom (such as roll angle $\alpha$, yaw angle $\beta$, pitch angle $\gamma$). The term "six degrees-of-freedom" is often used to refer to the six components of pose. Pose is given in relation to a frame of reference, which may be a local frame of reference or a global frame of reference. For example, FIG. 17 shows the scanner 10 having a local frame of reference 1710A given relative to a global frame of reference 1700. In an embodiment, the global frame of reference 1700 is fixed with respect to an object under test, while the scanner 10 is free to move in relation to the object under test. In other embodiments, the scanner 10 or other measuring device is fixed in space while the object moves. In this case, the global frame of reference 1700 is fixed with respect to a moving object under test, while the scanner 10 or other measuring device is fixed within the environment.

Figure 18:
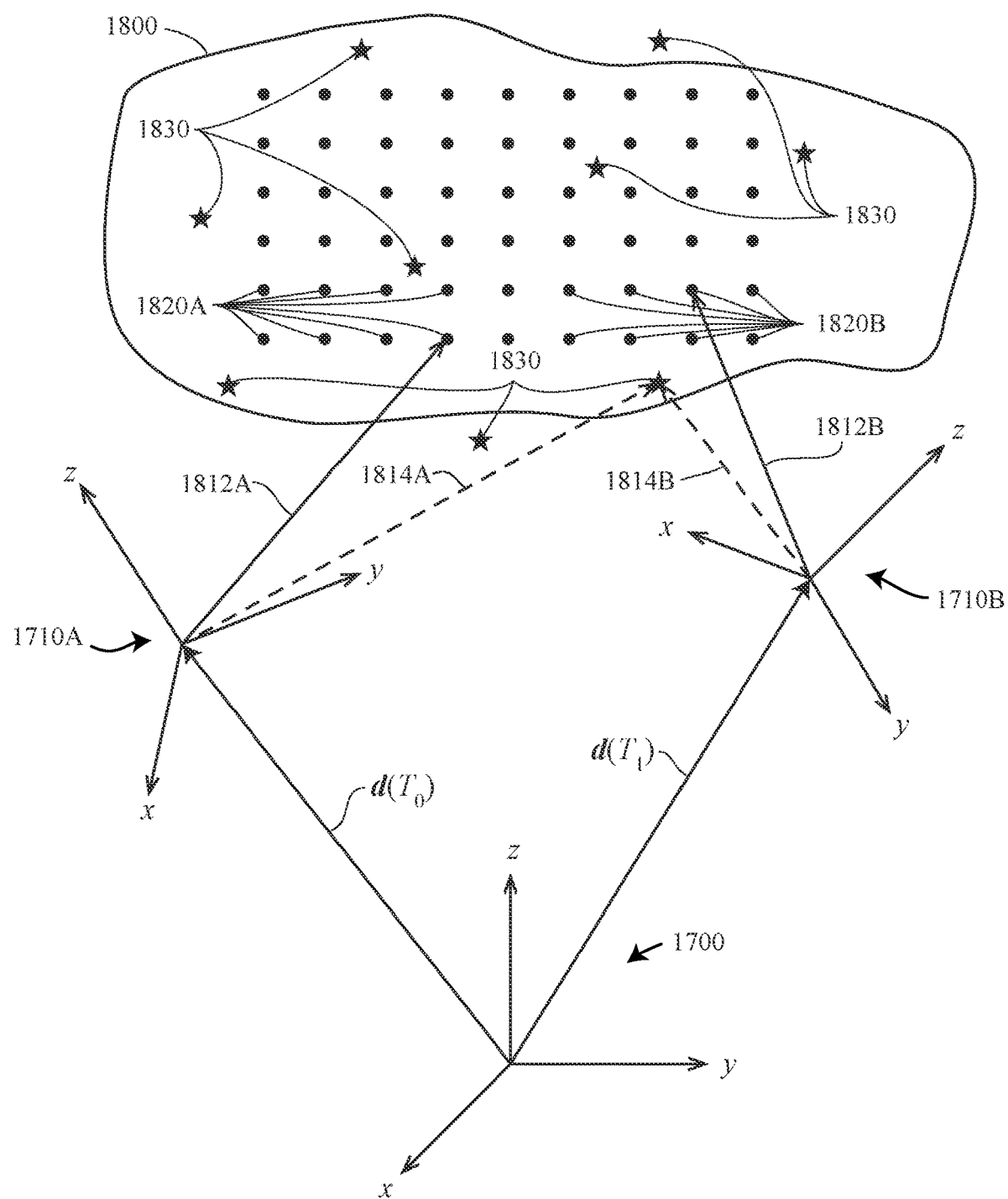
FIG. 18 is a schematic representation of an object fixed relative to a global frame of reference with a 3D measuring instrument coupled to a local frame of reference shown in two different poses according to an embodiment of the present invention.

In an embodiment illustrated in FIG. 18, an object 1800 is fixed with respect to the global frame of reference 1700, while an exemplary scanner such as the scanner 10 is moved to a plurality of poses fixed with respect to local frames of reference such as the frames of reference 1710A, 1710B. In an embodiment, the scanner 10 includes two measuring systems, a registration measuring system U that includes the registration camera 30 and a surface measuring system V that includes a first camera 20, a second camera 40, and a projector 50. In other systems, the surface measuring system V includes only one camera rather than two cameras. For the scanner 10 in the local frame of reference 1710A, the surface measuring system V determines, in the local frame of reference 1710A, 3D coordinates 1812A of IR points 1820A projected by the projector 50 onto the object 1800. It determines the 3D coordinates using triangulation, the principles of which are described herein above with respect to FIGS. 12, 13A, 13B, 14, 15, 16.

For the scanner 10 in the local frame of reference 1710B, the surface measuring system V determines, in the local frame of reference 1710B, 3D coordinates 1812B of IR points 1820B projected by the projector 50 onto the object 1800. In general, the projected points 1820A do not coincide precisely with the projected points 1810B on the object 1800. Also, in general projected points may have any wavelength—for example, visible wavelength rather than IR wavelength.

For the scanner 10 in the local frame of reference 1710A, the registration measuring system U that includes the registration camera 30 is used to determine two-dimensional (2D) coordinates 1814A of feature points 1830 in the camera pixel space. The feature points 1830 may be natural feature points (that is, points representative of natural features) on or off the object 1800 or they may be artificial target points such as points representative of stick-on reflective targets or illuminated targets (e.g., LED targets), again on or off the object 1800. Natural features might be readily recognized features such as edges or corners, or they may be more difficult to recognize features such as those seen after mathematical processing. Examples of such mathematical processing include scale-invariant feature transform (SIFT) and speeded up robust features (SURF). In FIG. 18, exemplary feature points 1830A captured by the camera 30 are represented by stars.

For the scanner 10 in the local frame of reference 1710B, the registration measuring system U that includes the registration camera 30 is used to determine 2D coordinates 1814B of the feature points 1830 in the camera pixel space. In an embodiment, a processor coupled to the scanner 10 compares the 2D coordinates of the points 1814A, 1814B to obtain correspondence among the feature points 1830 seen in camera images at the local frames of reference 1710A, 1710B. The processor uses this correspondence to determine a 3D representation of the feature points in 3D space.

Because the registration measuring system U permits the processor to combine measurements in the local frames of reference 1710A, 1710B to obtain the 3D coordinates of the feature points 1830, the processor is further able to combine in 3D space the 3D coordinates 1812A, 1812B of the projected IR points measured in the local frames of reference 1710A, 1710B. This method of obtaining 3D object point measurements is known from the prior art, for example, as described in commonly owned U.S. Pat. No. 9,599,455 filed on Jul. 14, 2013, the contents of which are incorporated by reference herein. However, for the case in which one or more of the cameras 20, 30, 40 are autofocus cameras, a method is needed for determining the correct compensation values for the autofocus cameras. An example of such a compensation value is the focal length of the autofocus camera. Such a method might also be usefully employed to make further adjustments in intrinsic camera parameters and some extrinsic camera parameters even if autofocus is not being used. Intrinsic parameters refer to parameter corrections made to a single camera system. For example, intrinsic parameters include camera focal length, camera perspective center (sometimes referred to as camera principal point), and camera aberrations. Extrinsic parameters refer to parameters that extend beyond a single camera and include such parameters as the distance between stereo cameras 20, 40 and the relative orientations of the cameras 20, 40. Intrinsic and extrinsic camera parameters may change in response to changes in temperature of the instrument or mechanical shocks to the instrument.

Suppose the scanner 10 is in the local frame of reference 1710A at a time $T_0$ and in the local frame of reference 1710B at a time $T_1$. One way to represent the pose at a given time is in terms of a transformation matrix P that transforms the global frame of reference 1700 into a local frame of reference, which is the pose P ($T_0$) for the local frame of reference 1710A and P ($T_1$) for the local frame of reference 1710B. One way to perform such a transformation is with a 4×4 homogeneous transformation matrix, which for P($T_0$) is $$P(T_0) = \begin{bmatrix} R(T_0) & d(T_0) \\ 0_{1 \times 3} & 1 \end{bmatrix} = \begin{bmatrix} R & d \\ 0_{1 \times 3} & 1 \end{bmatrix}_{T0}. \quad \text{(Eq. 1)}$$

The matrix subscript $T_0$ on the right of Eq. (1) indicates that the values in the matrix P($T_0$) are evaluated at the time $T_0$. The matrix R ($T_0$) is a 3×3 rotation matrix that causes the global frame of reference 1700 to rotate to the match the orientation of the local frame of reference 1710A. There are many ways to obtain a rotation in 3D space. A simple example is to first rotate the global frame of reference 1700 about the x axis, then about the y axis, and then about the z axis. There are many other possible rotations that can be used to obtain an orientation that matches the orientation of the local frame of reference 1710A. It is also possible to use quaternions to represent rotations, as is well known in the art. In general, the rotation matrix R ($T_0$) includes nine scalar values $r_{ij}$:

$$R(T_0) = \begin{bmatrix} r_{11} & r_{12} & r_{13} \\ r_{21} & r_{22} & r_{23} \\ r_{31} & r_{32} & r_{33} \end{bmatrix}_{T0}. \quad \text{(Eq. 2)}$$

The three-dimensional vector d is a vector that translates the origin of the global frame of reference to the local frame of reference. As shown in FIG. 18, the vector d($T_0$) translates the global frame of reference 1700 to the local frame of reference 1710A at the time $T_0$:

$$d(T_0) = \begin{bmatrix} x(T_0) \\ y(T_0) \\ z(T_0) \end{bmatrix}. \quad \text{(Eq. 3)}$$

The quantity $0_{1 \times 3}$ in Eq. 1 represents three zeroes in the fourth row of the matrix P ($T_0$). It can be shown that the pose P ($T_0$) relative to the pose P ($T_1$) is given by $$P_{10} = P(T_0) \cdot P(T_1)^{-1}. \quad \text{(Eq. 4)}$$

The relative pose $P_{10}$ may be determined using feature detection based on images captured by the registration measuring system U that includes the registration camera 30, as described herein above. In an embodiment, parameters (e.g., focal lengths of autofocus cameras) are adjusted until the surface measured by the surface measuring system V at the time $T_0$ matches the surface measuring system V at the time $T_1$ as well as possible. In an embodiment, this criterion is satisfied when the sum of squared differences of the surfaces measured by the surface measuring system V at times $T_0$ and $T_1$ are minimized. By this method, a surface measuring system V having one or more autofocus cameras can be rapidly adjusted to keep the surface measuring system in focus.

In an embodiment, the registration measuring system includes one or more autofocus cameras. In this case, the compensation parameters of the registration measuring system V (e.g., focal length of autofocus cameras that are part of the registration measuring system U) are adjusted until the sum of squared differences in the positions of the feature points is minimized. In other embodiments, other optimization methods besides the methods of least squares are used to optimize parameters of the registration measuring system.

If a hardware adjustment is made to an autofocus camera, the purpose of the adjustment is usually to make the captured image as sharp/clear as possible, while possibly also enlarging or shrinking objects captured in the resulting image. As explained herein above, compensation parameters for an autofocus camera in an instrument may be made even if no hardware adjustments are made. Such an adjustment might be made, for example, because of a change in temperature of the instrument. On the other hand, if autofocus camera hardware is adjusted, the adjustment might be monitored with position feedback signals. Such feedback signals might be, for example, highly accurate linear encoder signals or less accurate electrical motor signals. In any case, in an embodiment, the methods described herein are used to provide more accurate compensation parameters, resulting in improvements in scaling and positioning of 3D data points extracted from autofocus camera images.

One or more autofocus cameras may be included in either the registration measuring system U, the surface measuring system V, or both of the systems U and V. In an embodiment, the two autofocus systems are adjusted simultaneously. In this case, an optimization is simultaneously made on the previous measurements of the systems U and V. In this case, a global minimum is sought for an objective function that involves measurements made by both systems U and V. In another embodiment, the autofocus systems are adjusted one at a time. In this case, only those parameters of the adjusted autofocus camera system are modified.

In a further embodiment, a 3D measuring system may further include one or more actuators, such as the actuators 1702, 1704 in FIG. 17, to adjust an angle of the optical axes of each of two or more cameras such as the cameras 20, 40. An advantage of providing such adjustment possibility is that it provides the possibility for a 3D measuring instrument, such as the device 10, to focus on nearby objects as well as distant objects while keeping the imaged object both near the center of the images captured by the cameras 20, 40.

Figure 20:
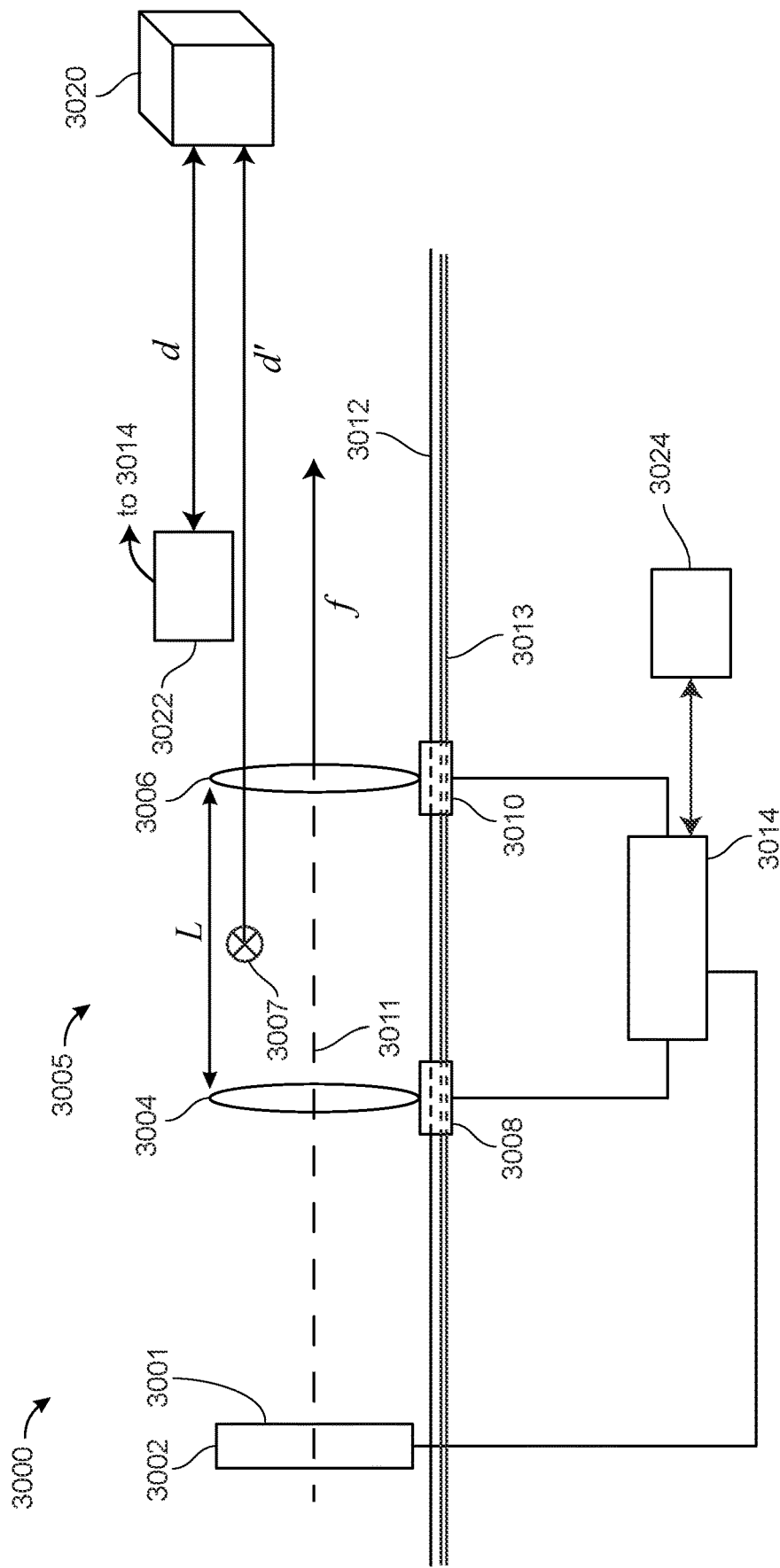
FIG. 20 is an exemplary autofocus lens according to an embodiment of the present invention.

A scanner having a camera with an adjustable focal length is described in commonly owned U.S. Published Patent Application No. 2020/0014909 ('909), filed on Jun. 19, 2019, the contents of which are incorporated by reference herein. FIG. 20 illustrates a camera system 3000 having a photosensitive array 3002, an adjustable lens system 3005, a processor system 3014, and optionally one or more optional sensors such as a distance meter 3022 or a contrast detection system 3024. The photosensitive array 3002 includes an image plane 3001. The exemplary adjustable lens system 3005 includes track 3012, one or more lenses such as the lenses 3004, 3006 and corresponding linear actuators such as 3008, 3010 that move along the track 3012. In an embodiment, the adjustable lens system 3005 further includes an optional scale 3013 such as a linear encoder for assisting in positioning of the actuators 3008, 3010. In an embodiment, the processor system 3014 cooperates with the actuators 3008, 3010 and with optional sensors such as 3022, 3024 to position the one or more lenses 3004, 3006. The distance meter 3022, if present, measures distance d from the distance meter 3022 to the object 3020. In an embodiment, the processor system 3014 uses the determined distance d to obtain a corrected distance d' from a perspective center 3007 of the lens system 3005 to the object 3020. The contrast detection system 3024, if present, determines whether an object is in focus based on a sharpness of images as determined by the processor system 3014 based at least in part on images captured by the photosensitive array 3002.

In the simplest case, the lens system includes only a single lens 3004, with the lens 3006 not present. When a first lens 3004 and a second lens 3006 are present, they are separated by distance L along a track 3012. Although the first lens 3004 and the second lens 3006 are shown as convex lenses, they can be any suitable combination of convex and concave lenses. The first lens 3004 is coupled to a first linear actuator 3008 that moves the first lens 3004 along the track 3012. The second lens 3006 is coupled to a second linear actuator 3010 that moves the second lens 3006 along the track 3012. If two lenses 3004, 3006 are present, the processor 3014 can adjust the distance of separation L and the position of the first lens 3008 to provide both a desired magnification and a clear, in-focus image of the object 3020. It is also possible for a single lens 3004 to be an electrically tunable lens (ETL) having a focal length that adjusts in response to an applied electrical signal. Common types of electrically tunable lenses (ETLs) include those based on electro-wetting, liquid crystals, or polymer membranes. An ETL having a polymer membrane may change shape in response to the amount of fluid enclosed by the membrane, for example.

In an embodiment, the distance measurement device 3022 determines the distance d based on a time-of-flight (TOF) measurement. A TOF measurement may be based, for example, on a measured time between emitted pulses of light or on a measured phase shift of emitted modulated light. In other embodiments, other types of distance measurement devices 3022 are used. In other embodiments, distance meters measure distance by emitting and receiving ultrasonic sound waves. Other types of distance meters may also be used.

In an embodiment, the contrast detection system 3024, which may operate based on software code run by the processor 3014, determines whether lenses such as the lenses 3004, 3006 have been adjusted to give maximum clarity and sharpness to images captured by the photosensitive array 3002. In an embodiment, image sharpness is evaluated by looking at the change in intensity difference between adjacent pixels of the photosensitive array 3002. Intensity difference between pixels increases with improved image clarity, which is commonly referred to bring the object "into focus."

In another embodiment, lenses such as the lenses 2006, 2008 are focused using a phase detection (PD) approach. In an embodiment, a phase-detection system divides incoming light into pairs of images, which are compared. One type of phase-detection system is a through-the-lens secondary image registration (TTL SIR) system that directs light to an autofocus (AF) sensor within the camera system 3000. Two micro-lenses capture light rays coming from opposite sides of the lens and send it to the AF sensor and separation error to determine the focus adjustment. In other embodiments, other methods are used for focus adjustment.

In an embodiment, a 3D measuring device includes a plurality of camera systems 3000. For example, the 3D measuring device 10 includes a surface registration measuring system that includes the cameras 20, 40 and a registration measuring system that includes the camera 30. Each of the cameras 20, 30, 40 may include elements of the camera system 3000. In an embodiment, at least some of the cameras in the 3D measuring device include an autofocus lens. For example, in the 3D measuring system 10, the cameras 20, 40 in the surface measuring system may be adjusted based at least in part on measurements made by the camera 30 in the registration measuring system according to the method 1900 of FIG. 19. Likewise, the camera 30 in the registration measuring system of the 3D measuring device 10 may be adjusted based at least in part on measurements made by the cameras 20, 40, which operate cooperatively with the projector 50.

Figure 19A:
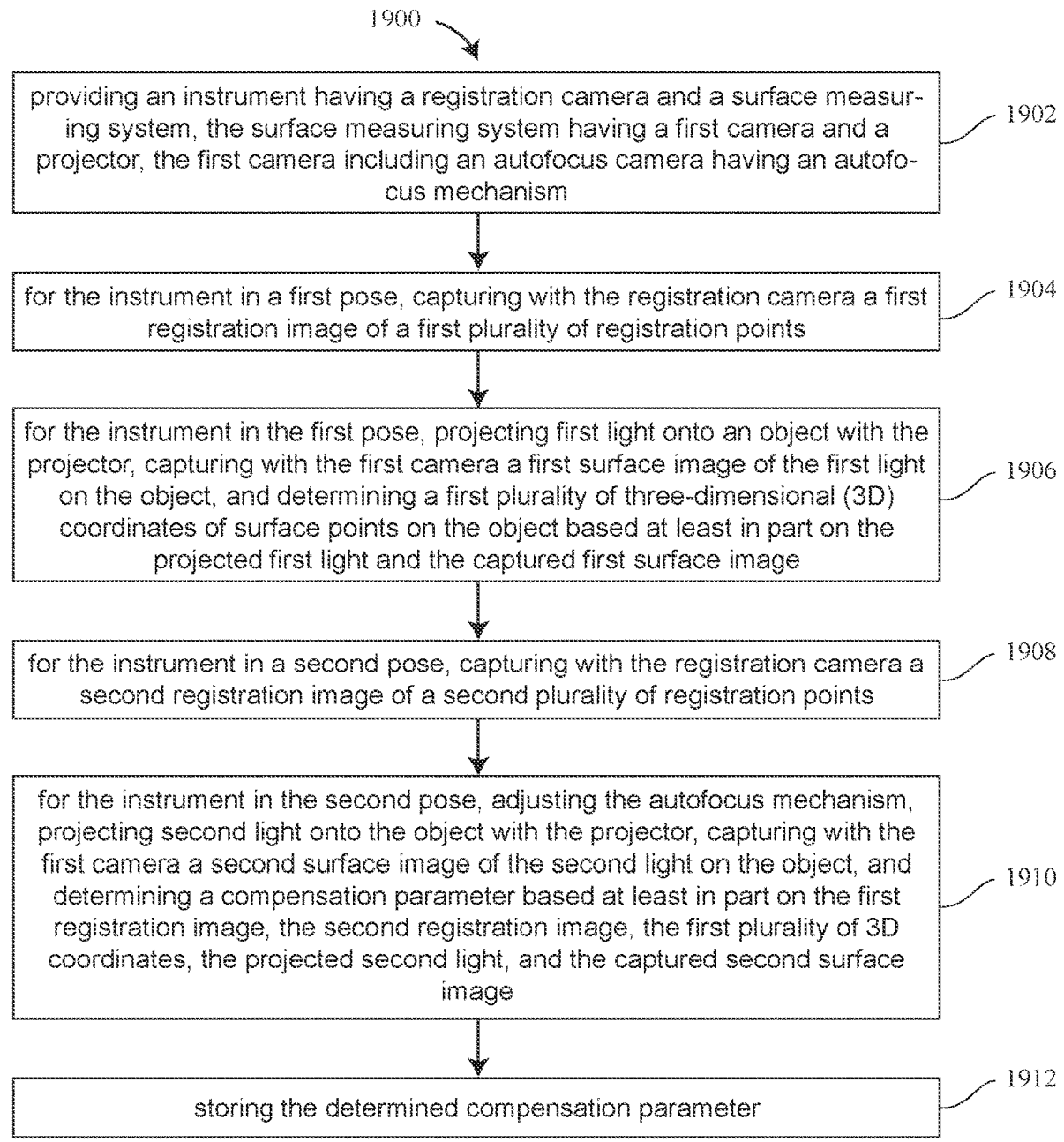
FIG. 19A is an embodiment of a method for determining a parameter of a 3D instrument according to an embodiment of the present invention.

FIG. 19A shows a block diagram indicating elements of a method 1900 according to an embodiment of the present invention. An element 1902 includes providing an instrument having a registration camera and a surface measuring system, the surface measuring system having a first camera and a projector, the first camera including an autofocus camera having an autofocus mechanism. For the example of the 3D measuring instrument 10, the first camera could be the camera 20. In the schematic representation of FIG. 20, the adjustable lens system 3005 might correspond to a first camera 10, where the first camera 10 was also an autofocus camera. Types of autofocus cameras and methods of adjusting autofocus cameras are described in more detail in the present document.

An element 1904 includes, for the instrument in a first pose, capturing with the registration camera a first registration image of a first plurality of registration points. In some embodiments, registration points in the registration image include either natural feature points or artificial marker points, or both. Here natural feature points refer to points extracted from features observed in the captured first registration image. Such features might be actual physical points such as corner points (such as might occur at the intersection of three planes, for example), edge points, or blob points. Such features might also be points obtained using mathematical methods such as scale-invariant feature transform (SIFT) or speed up robust features (SURF) algorithms.

An element 1906 includes, for the instrument in the first pose, projecting first light onto an object with the projector, capturing with the first camera a first surface image of the first light on the object, and determining a first plurality of three-dimensional (3D) coordinates of surface points on the object based at least in part on the projected first light and the captured first surface image. As explained herein above, there are many ways by which such 3D coordinates may be determined based on captured images. In the method of the 3D measuring device 10, the 3D coordinates are determined by projected a first light onto an object, the first light being an uncoded and unpatterned pattern of spots onto an object. In this system, the spots are detected with the cameras 20, 40. A processor applies triangulation to the observed points in the captured first surface image to determine the 3D coordinates of the projected first light within a frame of reference of the 3D measuring device 10. In other embodiments, the projected first light has a recognizable pattern that permits triangulation to be accomplished between the projector 30 and the camera 20 without having a second camera 40. In other embodiments, the projected first light is a line of light such as would be projected by a laser line scanner, also known as a laser line probe. The 3D coordinates are determined within a frame of reference of the instrument.

An element 1908 includes, for the instrument in a second pose, capturing with the registration camera a second registration image of a second plurality of registration points. In a common situation, an operator carries a 3D measuring instrument by hand, moving an instrument such as the device 10 from the first pose to a second pose. In an embodiment, the second registration image is compared to the first registration image. Matching features are identified, which enables the second registration image and the first registration image to be brought into a common frame of reference.

An element 1910 includes, for the instrument in the second pose, adjusting the autofocus mechanism, projecting second light onto the object with the projector, capturing with the first camera a second surface image of the second light on the object, and determining a compensation parameter based at least in part on the first registration image, the second registration image, the first plurality of 3D coordinates, the projected second light, and the captured second surface image. The are many mathematical methods by which one or more compensation parameters may be determined for the first camera or for the instrument as a whole. One method described herein above iteratively uses the equations (1) to (4) to obtain the compensation parameters for the first camera and/or the instrument as a whole. Such parameters may be intrinsic or extrinsic parameters as explained in the present document.

An element 1912 includes storing the determined compensation parameter.

Figure 19B:
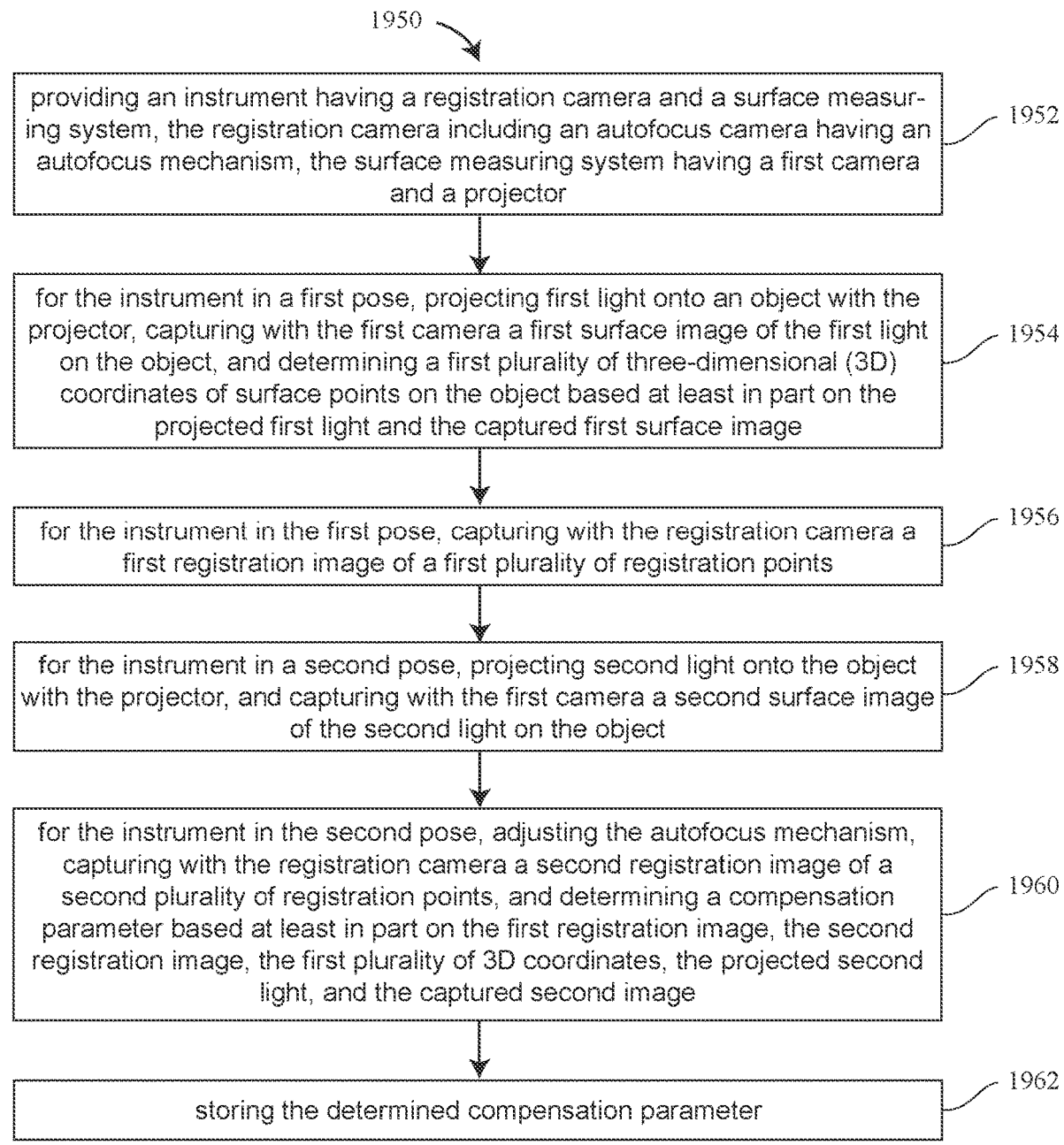
FIG. 19B is an embodiment of a method for determining a parameter of a 3D instrument according to an embodiment of the present invention.

FIG. 19B shows a block diagram indicating elements of a method 1950 according to an embodiment of the present invention. An element 1952 includes providing an instrument having a registration camera and a surface measuring system, the registration camera including an autofocus camera having an autofocus mechanism, the surface measuring system having a first camera and a projector. The element 1950 is similar to the element 1900 except that in the element 1950 the registration camera, rather than the first camera, includes the autofocus camera.

An element 1954 includes, for the instrument in a first pose, projecting first light onto an object with the projector, capturing with the first camera a first surface image of the first light on the object, and determining a first plurality of three-dimensional (3D) coordinates of surface points on the object based at least in part on the projected first light and the captured first surface image.

An element 1956 includes, for the instrument in the first pose, capturing with the registration camera a first registration image of a first plurality of registration points.

An element 1958 includes, for the instrument in a second pose, projecting second light onto the object with the projector, and capturing with the first camera a second surface image of the second light on the object.

An element 1960 includes, for the instrument in the second pose, adjusting the autofocus mechanism, capturing with the registration camera a second registration image of a second plurality of registration points, and determining a compensation parameter based at least in part on the first registration image, the second registration image, the first plurality of 3D coordinates, the projected second light, and the captured second image.

An element 1962 includes storing the determined compensation parameter.

The main difference in the methods of FIG. 19A and FIG. 19B is that method 1900 of FIG. 19A describes a method of performing an autofocus adjustment on one or more cameras of a surface measuring system that includes at least a first camera and a projector. In contrast, the method 1950 of FIG. 19B describes a method of performing an autofocus adjustment on a registration camera. It is possible to include autofocus adjustment mechanism in both a surface measuring system and a registration camera. In an embodiment, these autofocus adjustments are made at different times so that known parameters and pose of one system can be used to help determine unknown parameters and pose of the other system when applying equations (1) to (4). For example, the registration measuring system could be held fixed and used to help establish the pose and parameters of the surface measuring system undergoing an autofocus operation, or vice versa.

In an embodiment, the processor 3014 uses the method 1900 of FIG. 19A to determine parameters of the lens system 3005. For a handheld 3D measuring device, extrinsic parameters such as distance to an object under investigation changes as the 3D measuring device is moved around. It is therefore desirable to be able to adjust compensation parameters as measurements proceed. Furthermore, compensation parameters determined at a factory change in use for a number of reasons such as changes in environmental parameters such as ambient temperature, which through thermal expansion affects the relative positions of elements within the handheld 3D measuring device. Compensation parameters may also change as a result of mechanical shock, for example, in shipping or in routine handling. The method 1900 of FIG. 19 provides a method for updating changes in parameters in a 3D measuring instrument that result from such causes. As an example of improvements such adjustments in parameters can make, consider the effect of adjusting the focal length parameter of one or more cameras in a 3D measuring device such as the device 10. Such an adjustment will change the distance between object points measured by the 3D measuring instrument.

In addition, the method 1900 provides a way to improve auto-focus of a lens system 3000 in either of two ways. In a first way, auto-adjustment of the positions of lens elements such as 3004, 3006 or the focal length of a single lens having an ETL may be carried out based at least in part on parameters determined by the method 1900. In a second way, the auto-adjustment of positions of the lenses 3004, 3006 or of the ETL of a single lens may be carried out based on sensors within the system 3000. For example, the auto-adjustment may be based on the scale 3013, the distance measurement system 3022, the contrast detection system 3024, or any of the other auto-adjustment methods described herein above. In this case, the parameters are used to determine more accurately the values of intrinsic or extrinsic parameters of the camera systems within the 3D measuring device.

In an embodiment which the 3D measuring device includes a registration measuring system and a surface measuring system, as described above in reference to FIG. 19, it may be desirable to perform any adjustments in the positions of lenses or focal lengths of electronically tunable lenses by adjusting the registration measuring system and the surface measuring system one at a time. With this approach, the parameters of the unadjusted lens system can be used to provide the information needed to adjust the parameters of the other lens system.

Although embodiments have been often been described herein above with respect to the scanner 10, this is exemplary for purposes of clarity and not limiting. For example, the surface measuring system of scanner 10, which includes the projector 50 and the lenses 20, 40 may be replaced with other types of surface measuring systems. For example, in some embodiments the camera 20 or the camera 40 may be omitted so that triangulation is performed between the projector and a single camera 20 or 40. In another embodiment, the projector may be omitted, with the camera 20 and the camera 40 being operated as a stereo camera to obtain 3D coordinates based on their captured photogrammetric images. In a similar manner, although the surface measuring system of the scanner 10 includes a projector 50 that projects infrared (IR) spots of light onto an object, the projected spots of light may be visible or some other wavelength. Likewise, the light projected by the projector 50 need not be spots of light but may instead have a different pattern. For example, the projected pattern may include features recognizable in the images of the cameras 20, 40 and optionally in the pattern on the projection plane of the projector 50. In another embodiment, the projected pattern might be a laser line of light. In the scanner 10, the registration measuring system included a single camera. In other embodiments, the registration camera may include a plurality of cameras. The one or more registration cameras may be color cameras or cameras that measure at other wavelengths such as infrared wavelengths.

As used herein, the term "processor" or "processor system" may refer to an application specific integrated circuit (ASIC), a field programmable gate array (FPGA), a digital signal processor (DSP), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiments disclosed but includes all embodiments falling within the scope of the application.

What is claimed is:

1. A method comprising:
providing, within an environment, a measurement instrument including a registration camera and an autofocus camera having an autofocus mechanism configured to adjust a focal length of the autofocus camera;
for the measurement instrument in a first pose at a first time:
capturing with the registration camera a first registration image of a first plurality of feature points, each of the feature points corresponding to surface points on a surface of an object in the environment, wherein the first plurality of feature points includes reflections from at least one of: points corresponding to natural features on the surface of the object and targets placed on the surface of the object;
simultaneously capturing with the autofocus camera a first surface image that corresponds to the first registration image; and
determining, for each of the first plurality of feature points, a plurality of three-dimensional (3D) coordinates of corresponding surface points on the object based at least in part on the first surface image; and
for the measurement instrument in a second pose at a second time:
capturing with the registration camera a second registration image of a second plurality of feature points substantially corresponding to the first plurality of feature points;
adjusting with the autofocus mechanism the focal length of the autofocus camera to reduce a difference between positions of the first plurality of feature points and the second plurality of feature points;
capturing a second surface image of the object with the autofocus camera having the focal length that results from the adjusting;
determining a compensation parameter based at least in part on the second surface image; and
storing the determined compensation parameter.

2. The method of claim 1, the measuring device further including a projector, the method further comprising:
projecting light onto the object using the projector.

3. The method of claim 2, wherein the light is laser infrared light projected to display indicia on the object that correspond to computer aided design (CAD) system data.

4. The method of claim 1, wherein the registration camera is a color camera having a two-dimensional array of pixels, the method further comprising:
determining two dimensional coordinates of the plurality of feature points in the first registration image during the first time.

5. The method of claim 1, wherein the autofocus camera is an infrared camera and the first surface image and the second surface image are infrared images.

6. The method of claim 1, wherein the measurement instrument further comprises at least one of a laser line generator, a mobile computing device, an inertial measurement unit (IMU), a global positioning system (GPS), and a robot arm.

7. The method of claim 1, further comprising:
determining the compensation parameter further based at least in part on the first registration image, the second registration image, the plurality of 3D coordinates, and the second surface image.

8. The method of claim 1, further comprising:
determining the compensation parameter further based on at least one of an intrinsic parameter of the first camera and an extrinsic parameter of the measuring instrument.

9. The method of claim 1, wherein the autofocus camera comprises a plurality of autofocus cameras that are used to identify and correct errors in compensation parameters by determining inconsistencies in results obtained from triangulation calculations between at least two of the autofocus cameras.

10. The method of claim 1 further comprising:
determining at the second time a second plurality of 3D coordinates of surface points on the object based at least in part on the compensation parameter resulting from the determining, the first registration image, the second registration image, the first plurality of 3D coordinates and the second surface image.

11. The method of claim 1, further comprising:
matching features in the first registration image and the second registration image to determine a common frame of reference.

12. The method of claim 1, wherein the autofocus camera adjusts the focal length until the sum of squared differences in the positions of the first plurality of feature points and the second plurality of feature points is minimized.

13. A measurement instrument apparatus, comprising:
a registration camera;
an autofocus camera having an autofocus mechanism configured to adjust a focal length of the autofocus camera;
at least one processor; and
an electronic memory storing programming instructions for execution by the at least one processor to:
capture with the registration camera at a first time, a first registration image of a first plurality of feature points corresponding to surface points on a surface of an object in an environment;
simultaneously capture with the autofocus camera a first surface image that corresponds to the first registration image;
determine, for each of the first plurality of feature points, a plurality of three-dimensional (3D) coordinates of corresponding surface points on the object based at least in part on the first surface image;
capture with the registration camera at a second time a second registration image of a second plurality of feature points substantially corresponding to the first plurality of feature points;
adjust with the autofocus mechanism the focal length of the autofocus camera to reduce a difference between positions of the first plurality of feature points and the second plurality of feature points;
capture a second surface image of the object with the autofocus camera having the focal length;
determine a compensation parameter based at least in part on the second surface image; and
store, in the electronic memory, the determined compensation parameter for use with adjusting feature points captured in additional images,
wherein the autofocus camera is an infrared camera and the first surface image and the second surface image are infrared images.

14. The measurement instrument apparatus of claim 13, further including a projector for projecting light onto the object.

15. The measurement instrument apparatus of claim 13, wherein the registration camera is a color camera having a two-dimensional array of pixels, and the programming instructions further enable the at least one processor to determine two dimensional coordinates of the first plurality of feature points in the first registration image during the first time.

16. The measurement instrument apparatus of claim 13, further comprising at least one of: a laser line generator, a mobile computing device, an inertial measurement unit (IMU), a global positioning system (GPS), and a robot arm.

17. The measurement instrument apparatus of claim 13, wherein the autofocus camera comprises a plurality of autofocus cameras that are used by the at least one processor to identify and correct errors in the compensation parameter by determining inconsistencies in results obtained from triangulation calculations between at least two of the autofocus cameras.

18. A method comprising:
activating, within an environment, a measurement instrument including a registration camera and an autofocus camera having an autofocus mechanism configured to adjust a focal length of the autofocus camera;
for the measurement instrument at a first time:
capturing with the registration camera a first registration image of a first plurality of feature points, each of the feature points corresponding to surface points on a surface of an object in the environment;
simultaneously capturing with the autofocus camera a first surface image that corresponds to the first registration image; and
determining, for each of the first plurality of feature points, a plurality of three-dimensional (3D) coordinates of corresponding surface points on the object based at least in part on the first surface image; and
for the measurement instrument at a second time:
capturing with the registration camera a second registration image of a second plurality of feature points substantially corresponding to the first plurality of feature points;
matching features in the first registration image and the second registration image to determine a common frame of reference;
adjusting with the autofocus mechanism the focal length of the autofocus camera to reduce a difference between positions of the first plurality of feature points and the second plurality of feature points;
capturing a second surface image of the object with the autofocus camera having the focal length that results from the adjusting;
determining a compensation parameter based at least in part on the second surface image; and
storing the determined compensation parameter for use with adjusting feature points captured in additional images.

\* \* \* \* \*